United States Patent
Yasutake

(10) Patent No.: US 10,482,199 B2
(45) Date of Patent: Nov. 19, 2019

(54) THERMAL RESISTANCE ANALYSIS MODEL AND SEMICONDUCTOR INTEGRATED CIRCUIT

(71) Applicant: Rohm Co., Ltd., Kyoto (JP)

(72) Inventor: Ippei Yasutake, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 63 days.

(21) Appl. No.: 15/813,283

(22) Filed: Nov. 15, 2017

(65) Prior Publication Data
US 2018/0075176 A1 Mar. 15, 2018

Related U.S. Application Data

(63) Continuation of application No. PCT/JP2016/061898, filed on Apr. 13, 2016.

(30) Foreign Application Priority Data

May 18, 2015 (JP) .................... 2015-100905

(51) Int. Cl.
*G06F 17/50* (2006.01)
*H01L 23/48* (2006.01)
*H01L 23/50* (2006.01)

(52) U.S. Cl.
CPC .......... *G06F 17/5013* (2013.01); *G06F 17/50* (2013.01); *G06F 17/5081* (2013.01);
(Continued)

(58) Field of Classification Search
CPC ............. G06F 17/5013; G06F 2217/40; G06F 2217/80; G06F 17/5081
(Continued)

(56) References Cited

U.S. PATENT DOCUMENTS 8,628,236 B2 1/2014 Bornoff et al.
2013/0060533 A1* 3/2013 Okutani .................. G06F 17/50
703/1

FOREIGN PATENT DOCUMENTS

JP 2008-10617 1/2008

OTHER PUBLICATIONS

Japan Patent Office, International Search Report for PCT/JP2016061898, dated Jun. 7, 2016 (with English translation).
(Continued)

*Primary Examiner* — Sun J Lin
(74) *Attorney, Agent, or Firm* — Fish & Richardson P.C.

(57) ABSTRACT

A thermal resistance analysis model of a semiconductor integrated circuit comprising a die and a semiconductor chip disposed on the die, the die constituting a bottom inner node BI, the semiconductor chip including a local heat-generating portion constituting a junction node JN, the semiconductor chip constituting an additional plate node PN, a first thermal resistance θJP between the junction node JN and the additional plate node PN; and a second thermal resistance θPBI between the additional plate node PN and the bottom inner node BI, wherein the semiconductor integrated circuit is expressed by a multi-thermal resistance network. Disclosed herein are a thermal resistance analysis model with satisfactory precision as a thermal resistance analysis model of locally heat-generating semiconductor integrated circuits; and a semiconductor integrated circuit to which such a thermal resistance analysis model is applied.

20 Claims, 19 Drawing Sheets

(52) U.S. Cl.
CPC .............. *H01L 23/48* (2013.01); *H01L 23/50* (2013.01); *G06F 2217/40* (2013.01); *G06F 2217/80* (2013.01)

(58) Field of Classification Search
USPC ................................................ 716/100, 106
See application file for complete search history.

(56) References Cited

OTHER PUBLICATIONS

Galloway et al., "Characterizing Junction-to-Case Thermal Resistance and its Impact on End-Use Applications," [online], Thermal and Thermomechanical Phenomena in Electronic Systems (ITherm), 13th IEEE Intersociety Conference, pp. 1342-1347 (May 30, 2012).
Galloway and Shidore, "Implementing Compact Thermal Models Under Non-Symmetric Trace Routing Conditions," [online], Semiconductor Thermal Measurement and Management Symposium, Twentieth Annual IEEE, pp. 255-261 (Mar. 9, 2004).
Monier-Vinard et al., "Latest Developments of Compact Thermal Modeling of System-in-Package Devices by means of Genetic Algorithm," [online], Thermal and Thermomechanical Phenomena in Electronic Systems(ITherm), IEEE Intersociety Conference, pp. 998-1006 (May 27, 2014).
Monier-Vinard, E., et al., "Extension of the DELPHI Methodology to Dynamic Compact Thermal Model of Electronic Component," Thermal Investigations of ICS and Systems (THERMINIC), Sep. 27, 2011, pp. 1-6.
Jedec Jc-15 Committee: "DELPHI Compact Thermal Model Guideline: JESD 15-4," Oct. 2008, pp. 1-20, Retrieved from the Internet: URL: https://www.dedec.org/standards-documents/doc/jesd-15-4 [retrieved on Oct. 25, 2018].
Wei Huang et al, "Hotspot: A Compact Thermal Modeling Methodology for Early-Stage VLSI design," IEEE Transactions on Very Large Scale Integration (VLSI) Systems, vol. 14, No. 5, May 2006 (May 2006), pp. 501-513.
Clemens J. M. Lasance, "Ten Years of Boundary-Condition-Independent Compact Thermal Modeling of Electronic Parts: A Review," Heat Transfer Engineering, vol. 29, No. 2, Feb. 2008 (Feb. 2008), pp. 149-168.
European Patent Office; Extended European Search Report mailed in corresponding Patent Application No. 16796231.5 (dated Nov. 6, 2018).

* cited by examiner $\theta$ JA=20.6°C/W $\theta$ JA=20.7°C/W $\theta$ JA=31.6°C/W

FIG. 18

| START POINT NODE | END POINT NODE | THERMAL RESISTANCE(°C/W) |
|---|---|---|
| TI | TO | 1480.252 |
| LES | TI | 204.1942 |
| LES | TO | 41.0265 |
| LEF | LES | 5.04093 |
| JN | TI | 105.3639 |
| JN | LES | 1178.72 |
| BO | TO | 228.9151 |
| BO | LES | 29.66631 |
| BI | TI | 53.12411 |
| BI | TO | 531.4026 |
| BI | BO | 81.87319 |
| BI | LES | 132.2011 |
| SI | TI | 4944.794 |
| SI | TO | 56.20221 |
| SI | BO | 842.6625 |
| SI | LES | 54.36249 |
| PN | JN | 12.3 |
| PN | BI | 2.26567 |

| SUBSTRATE SPECIFICATION | HEAT SOURCE | MODEL TYPE | $T_J$ (°C) | $T_{PN}$ (°C) | $T_a$ (°C) | P (W) | $\theta_{JA}$ (°C/W) | ERROR WITH DETAILED MODEL |
|---|---|---|---|---|---|---|---|---|
| 2s2p (4LAYER) | 1ch | DETAILED MODEL | 115.5 | 79.5 | 20.6 | 3.0 | 31.6 | — |
| | | DELPHI MODEL | 91.9 | — | 20.6 | 3.0 | 23.7 | 33% |
| | | LOCAL DELPHI MODEL | 115.4 | 81.9 | 20.6 | 3.0 | 31.6 | 0% |
| | WHOLE SURFACE | DETAILED MODEL | 82.5 | — | 20.6 | 3.0 | 20.6 | — |
| | | DELPHI MODEL | 82.6 | — | 20.6 | 3.0 | 20.7 | 0% |
| 2s (2LAYER) | 1ch | DETAILED MODEL | 139.5 | 100.0 | 20.6 | 3.0 | 39.6 | — |
| | | DELPHI MODEL | 112.6 | — | 20.6 | 3.0 | 30.6 | 29% |
| | | LOCAL DELPHI MODEL | 136.1 | 102.6 | 20.6 | 3.0 | 38.5 | 3% |
| | WHOLE SURFACE | DETAILED MODEL | 103.9 | — | 20.6 | 3.0 | 27.7 | — |
| | | DELPHI MODEL | 103.6 | — | 20.6 | 3.0 | 27.7 | 0% |
| 1s (1LAYER) | 1ch | DETAILED MODEL | 148.0 | 139.0 | 20.2 | 0.7 | 182.6 | — |
| | | DELPHI MODEL | 134.5 | — | 20.1 | 0.7 | 163.3 | 12% |
| | | LOCAL DELPHI MODEL | 139.5 | 132.0 | 20.1 | 0.7 | 170.6 | 7% |
| | WHOLE SURFACE | DETAILED MODEL | 139.7 | — | 20.2 | 0.7 | 170.7 | — |
| | | DELPHI MODEL | 135.8 | — | 20.1 | 0.7 | 165.2 | 3% |

THERMAL RESISTANCE ANALYSIS MODEL AND SEMICONDUCTOR INTEGRATED CIRCUIT

CROSS REFERENCE TO RELATED APPLICATIONS

This is a continuation application (CA) of PCT Application No. PCT/JP2016/061898, filed on Apr. 13, 2016, which claims priority to Japan Patent Application No. P2015-100905 filed on May 18, 2015 and is based upon and claims the benefit of priority from prior Japanese Patent Applications No. P2015-100905 filed on May 18, 2015 and PCT Application No. PCT/JP2016/061898, filed on Apr. 13, 2016, the entire contents of each of which are incorporated herein by reference.

FIELD

Embodiments described herein relate to a thermal resistance analysis model and a semiconductor integrated circuit.

BACKGROUND

In general, fabricating process of semiconductor integrated circuits undergoes procedures of concept designs, basic designs, detailed designs, prototype/debugging, and design variations/mass productions. However, a degree of flexibility in countermeasures is relatively large in an initial process, but the degree of flexibility thereof is reduced as the process advances toward a post-process. On the other hand, a countermeasure cost of the fabrication process is relatively small in the initial process but the countermeasure cost thereof is increased as the process advances toward the post-process. Accordingly, the total process number can be reduced by placing weight on the initial process. Also in thermal designs of semiconductor integrated circuits, it is necessary to advance such a front loading for placing weight on the initial process.

With miniaturization of semiconductor integrated circuit components, ambient temperatures Ta of devices have been greatly influenced depending on arrangement of each heat-generating component on mounting substrates. Moreover, with high-density mounting on mounting substrates, there has also occurred a situation of thermally interfering between adjacent semiconductor integrated circuit components. Accordingly, for example, analyses to which Computational Fluid Dynamics (CFD) is applied have been required therefor, and therefore needs for a thermal resistance model necessary for the analyses have grown.

In order to predict temperatures of each part of semiconductor integrated circuits including junction temperatures with a high degree of precision, precise models of internal structures will certainly be required. For example, a high-precision model in consideration of internal structures of semiconductor integrated circuits has been proposed as an analysis tool, and has been adopted by the Joint Electron Device Engineering Councils (JEDEC) which is a standard-setting organization.

SUMMARY

The embodiment provides: a thermal resistance analysis model with satisfactory precision as a thermal resistance analysis model of locally heat-generating semiconductor integrated circuits; and a semiconductor integrated circuit to which such a thermal resistance analysis model is applied.

According to one aspect of the embodiments, there is provided a thermal resistance analysis model comprising: in a semiconductor integrated circuit comprising a die and a semiconductor chip disposed on the die, the die constituting a bottom inner node, the semiconductor chip including a local heat-generating portion constituting a junction node, the semiconductor chip constituting an additional plate node, a first thermal resistance between the junction node and the plate node; and a second thermal resistance between the plate node and the bottom inner node, wherein the semiconductor integrated circuit is expressed by a multi-thermal resistance network.

According to another aspect of the embodiments, there is provided a thermal resistance analysis model comprising: in a semiconductor integrated circuit comprising a die and a semiconductor chip disposed on the die, the die constituting a bottom inner node, the semiconductor chip including a first local heat-generating portion constituting a first junction node and a second local heat-generating portion constituting a second junction node, the second local heat-generating portion separated from the local heat-generating portion, the semiconductor chip constituting an additional plate node, a first thermal resistance between the first junction node and the plate node; a second thermal resistance between the plate node and the bottom inner node; a third thermal resistance between the plate node and the second junction node; and a fourth thermal resistance between the first junction node and the second junction node, wherein the semiconductor integrated circuit is expressed by a multi-thermal resistance network.

According to a still another aspect of the embodiments, there is provided a semiconductor integrated circuit to which the above-mentioned thermal resistance analysis model is applied.

According to the embodiments, there can be provided: the thermal resistance analysis model with satisfactory precision as a thermal resistance analysis model of locally heat-generating semiconductor integrated circuits; and the semiconductor integrated circuit to which such a thermal resistance analysis model is applied.

BRIEF DESCRIPTION OF DRAWINGS

FIG. 18 shows a result of a thermal resistance analysis of each unit in a semiconductor integrated circuit to which a Local DELPHI model is applied as the thermal resistance analysis model according to the first embodiment.

FIG. 20 shows: numerical examples calculated by applying the detailed model and the DELPHI model as the comparative example; and numerical examples calculated by applying the Local DELPHI model as the thermal resistance analysis model according to the first embodiment; in a cases of using various substrate specifications and using the whole surface heat source and the local heat source.

DESCRIPTION OF EMBODIMENTS

Figure 1:
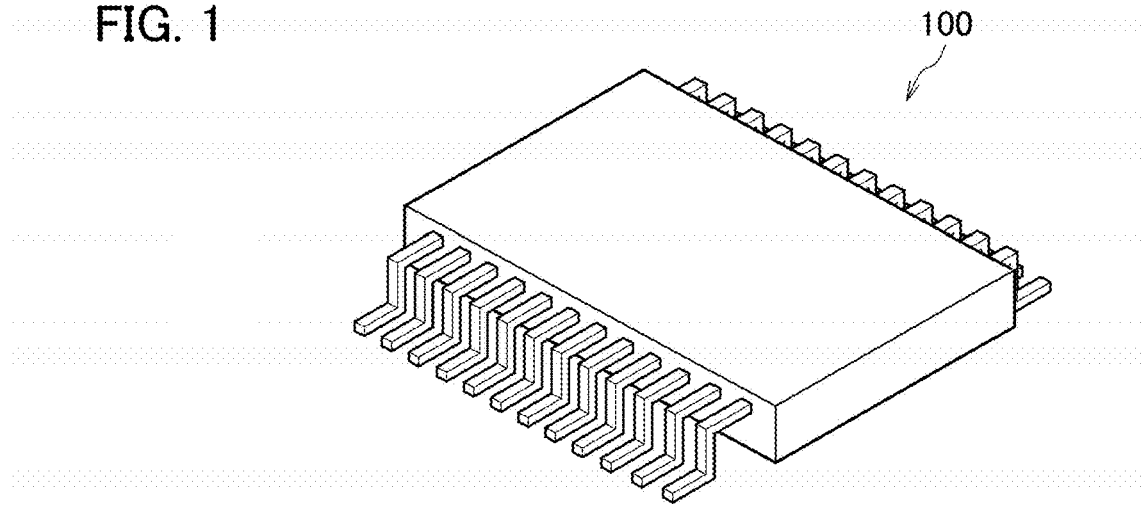
FIG. 1 is a bird's-eye view showing a semiconductor integrated circuit to which a thermal resistance analysis model according to a first embodiment is applied.

Next, certain embodiments will now be described with reference to drawings. In the description of the following drawings, the identical or similar reference numeral is attached to the identical or similar part. However, it should be noted that the drawings are schematic and therefore the relation between thickness and the plane size and the ratio of the thickness differs from an actual thing. Therefore, detailed thickness and size should be determined in consideration of the following explanation.

Moreover, the embodiments shown hereinafter exemplify the apparatus and method for materializing the technical idea; and the embodiments does not specify the material, shape, structure, placement, etc. of each component part as the following. The embodiments may be changed without departing from the spirit or scope of claims.

In the following explanation, atop inner node TI may merely be expressed as a top inner TI. Similarly, a bottom inner node BI, a bottom outer node BO, a top outer node TO, a side node SI, a lead node LE, a lead foot node LEF, and a lead side node LES are respectively expressed as a bottom inner BI, a bottom outer BO, a top outer TO, a side SI, a lead LE, a lead foot LEF, and a lead side LES.

[First Embodiment]

FIG. 1 shows an example of a bird's-eye view configuration of a semiconductor integrated circuit 100 to which a thermal resistance analysis model according to the first embodiment is applied. A semiconductor (LSI) chip can be mounted in the semiconductor integrated circuit 100.

Figure 2A:
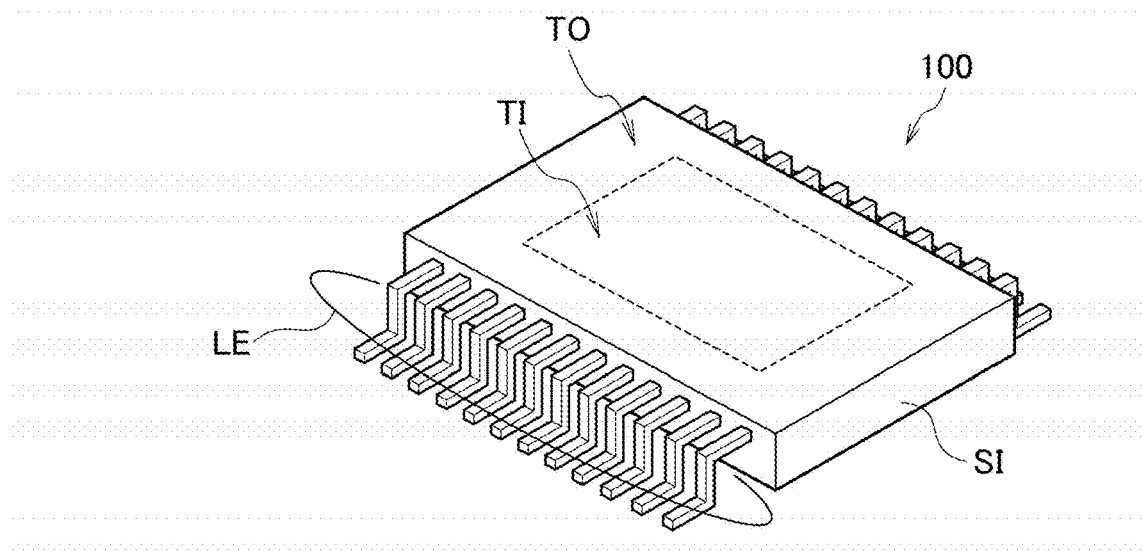
FIG. 2A is an explanatory diagram showing a top inner TI, a top outer TO, a side SI, and a lead LE, in the semiconductor integrated circuit to which the thermal resistance analysis model according to the first embodiment is applied.
Figure 2B:
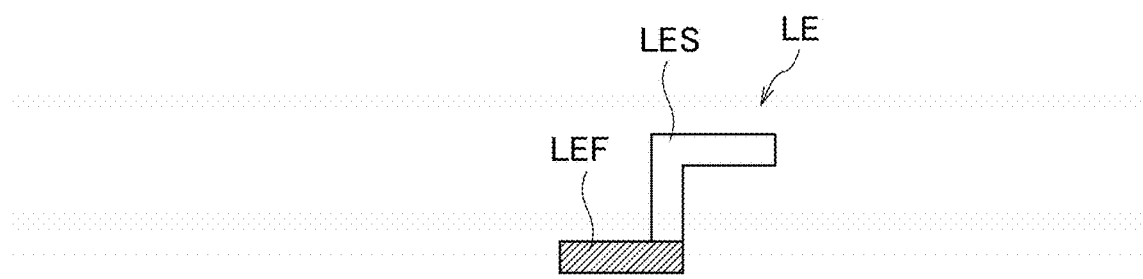
FIG. 2B is an explanatory diagram showing a lead side LES and a lead foot LEF in the lead LE, in the semiconductor integrated circuit to which the thermal resistance analysis model according to the first embodiment is applied.

FIG. 2A shows an explanation of each of a top inner TI, a top outer TO, a side SI, and a lead LE, in the semiconductor integrated circuit 100 to which the thermal resistance analysis model according to the first embodiment is applied. Moreover, FIG. 2B shows an explanation of each of a lead foot LEF and a lead side LES in the lead LE.

Figure 3A:
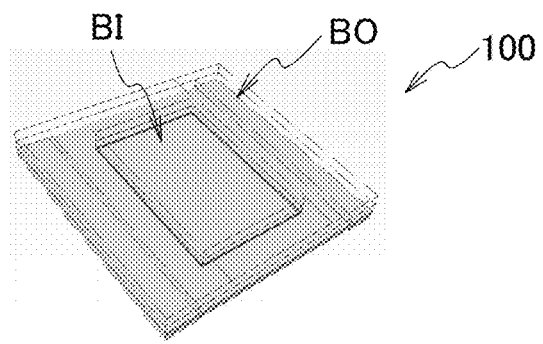
FIG. 3A is an explanatory diagram showing a bottom inner BI and a bottom outer BO, in the semiconductor integrated circuit to which the thermal resistance analysis model according to the first embodiment is applied.
Figure 3B:
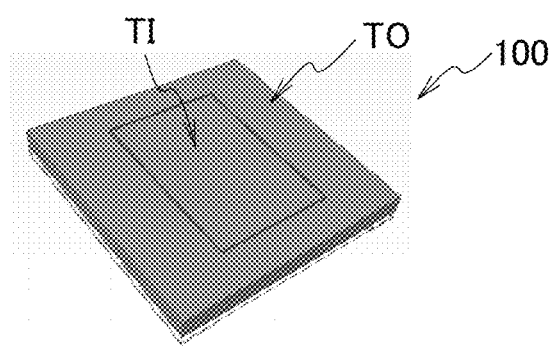
FIG. 3B is an explanatory diagram showing a top inner TI and a top outer TO, in the semiconductor integrated circuit to which the thermal resistance analysis model according to the first embodiment is applied.
Figure 3C:
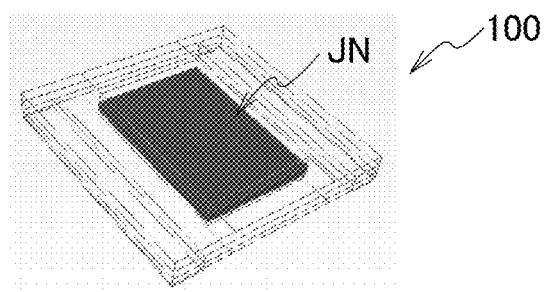
FIG. 3C is an explanatory diagram showing a junction node JN, in the semiconductor integrated circuit to which the thermal resistance analysis model according to the first embodiment is applied.
Figure 3D:
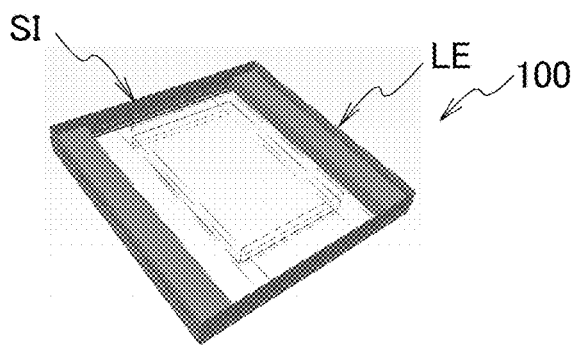
FIG. 3D is an explanatory diagram showing a side SI and a lead LE, in the semiconductor integrated circuit to which the thermal resistance analysis model according to the first embodiment is applied.

In the semiconductor integrated circuit 100 to which the thermal resistance analysis model according to the first embodiment is applied, FIG. 3A shows an explanation of each of a bottom inner BI and a bottom outer BO, and FIG. 3B shows an explanation of each of the top inner TI and the top outer TO. Moreover, FIG. 3C shows an explanation of a portion of a junction node JN. Moreover, FIG. 3D shows an explanation of a portions of the side SI and the lead LE.

(Comparative Example)

As a thermal resistance analysis model according to a comparative example to which the CFD is applied, it can be selected from three models, a detailed model, a DELPHI model, and a two-resistance model, in accordance with an object of an analysis. The detailed model is configured to model an internal structure in detail as much as possible, while being simplified by utilizing a fact that they are thermally equivalent. The two-resistance model has the general simplest format, and is configured to simply model a shape as two thermal resistance. The DELPHI model is a thermal resistance model modeled by equal to or greater than six thermal resistances, more detailed than the two-resistance model.

—Two-Resistance Compact Model—

Figure 4:
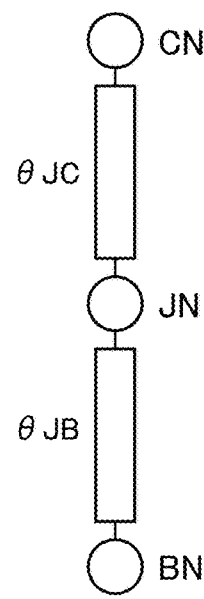
FIG. 4 is an explanatory diagram showing a shape of a two-resistance model (JESD15-3) as a thermal resistance analysis model according to a comparative example to which a CFD is applied.

FIG. 4 shows an explanation of a shape of a two-resistance compact model (JESD15-3) as a thermal resistance analysis model according to the comparative example to which a CFD is applied. The shape of the two-resistance compact model (JESD15-3) includes a simple model in which a semiconductor integrated circuit 100 is divided from a junction node JN in an up-and-down direction, as shown in FIG. 4. More specifically, as shown in FIG. 4, the two-resistance compact model (JESD15-3) includes: a junction node JN; a case node CN; a board node BN; a thermal resistance θJC disposed between the junction node JN and the case node CN; and a thermal resistance θJB disposed between the junction node JN and the board node BN. In this context, the junction node JN corresponds to a junction portion becoming a heat source of a semiconductor chip. The case node CN corresponds to a case portion disposed from the junction node JN in an upward direction. Moreover, the board node BN corresponds to a mounting substrate portion on which the semiconductor chip is mounted.

As the thermal resistance analysis model according to the comparative example to which the CFD is applied, the junction node JN of the two-resistance compact model (JESD15-3) is composed by including one node. Moreover, a precision as the heat generation model is relatively low.

—DELPHI Compact Model—

Figure 5:
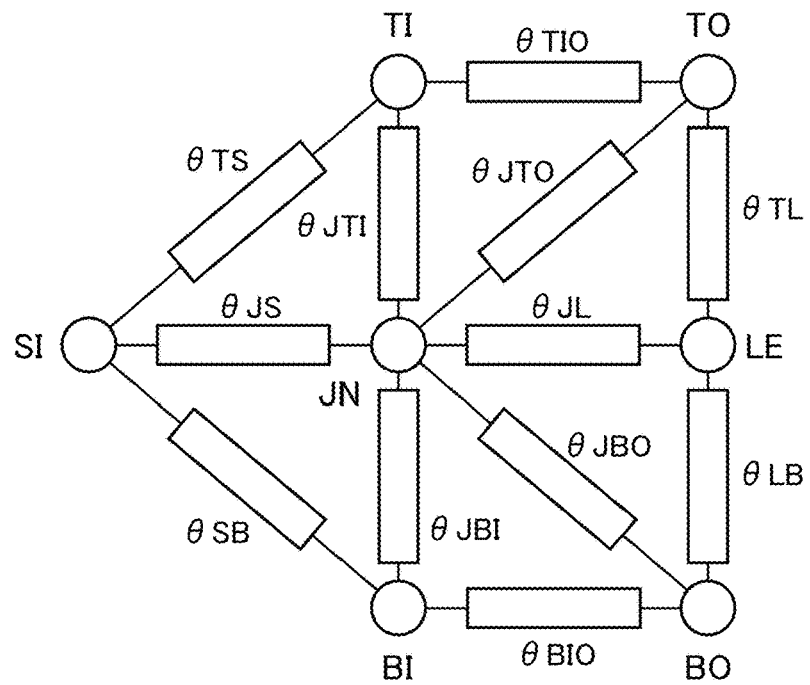
FIG. 5 is an explanatory diagram showing a shape of a DELPHI model (JESD15-4) as the thermal resistance analysis model according to the comparative example to which the CFD is applied.

FIG. 5 shows an explanation of a shape of a DELPHI compact model (JESD15-4) as the thermal resistance analysis model according to the comparative example to which the CFD is applied.

The shape of the DELPHI compact model (JESD15-4) includes a model which expresses a semiconductor integrated circuit with a multi-thermal resistance network, as shown in FIG. 5. More specifically, as shown in FIG. 5, the DELPHI compact model (JESD15-4) includes: a junction node JN; a top inner node TI; a top outer node TO; a bottom inner node BI; a bottom outer node BO; a side node SI; a lead node LE; a thermal resistance θJTI disposed between the junction node JN and the top inner node TI; a thermal resistance θJTO disposed between the junction node JN and the top outer node TO; a thermal resistance θTS disposed between the junction node JN and the side node SI; a thermal resistance θJL disposed between the junction node JN and the lead node LE; a thermal resistance θJBI disposed between the junction node JN and the bottom inner node BI; a thermal resistance θJBO disposed between the junction node JN and the bottom outer node BO; a thermal resistance θTIO disposed between the top inner node TI and the top outer node TO; a thermal resistance θTS disposed between the top inner node TI and the side node SI; a thermal resistance θTL disposed between the top outer node TO and the lead node LE; a thermal resistance θSB disposed between the side node SI and the bottom inner node BI; a thermal resistance θLB disposed between the lead node LE and the bottom outer node BO; and a thermal resistance θBIO disposed between the bottom inner node BI and the bottom outer node BO.

Moreover, the bottom inner node BI and the bottom outer node BO respectively correspond to an inside portion and an outside portion of the mounting substrate portion on which the semiconductor chip is mounted, in the semiconductor integrated circuit, as shown in FIG. 3A.

Moreover, the top inner node TI and the top outer node TO respectively correspond to an inside portion and an outside portion of the upper surface case portion in which the semiconductor chip is disposed, in the semiconductor integrated circuit, as shown in FIGS. 2A and 3B.

Moreover, the junction node JN corresponds to a junction portion which becomes the heat source of the semiconductor chip, in the semiconductor integrated circuit, as shown in FIG. 3C.

Moreover, the side node SI and the lead node LE respectively correspond to a side portion of the case portion in which the semiconductor chip is mounted and an disposing portion of the lead terminal, in the semiconductor integrated circuit, as shown in FIGS. 2A and 3D.

As the thermal resistance analysis model according to the comparative example, the junction node JN of the DELPHI compact model (JESD15-4) is composed by including one node. Although a precision as the heat generation model is satisfactory, it is difficult to respond to a local heat generation.

—Detailed Model—

Figure 6:
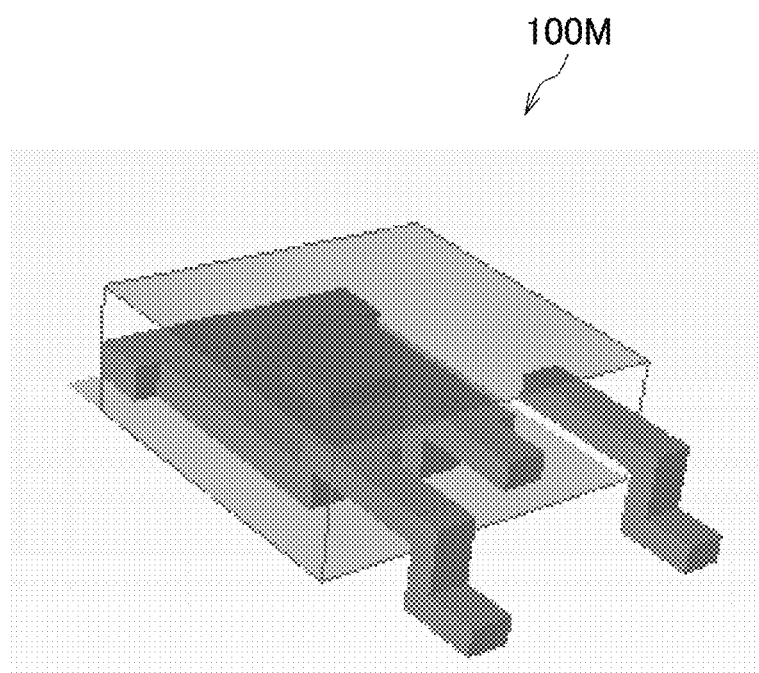
FIG. 6 is an explanatory diagram showing a shape of a detailed model (no corresponding standard) as the thermal resistance analysis model according to the comparative example to which the CFD is applied.

FIG. 6 shows an explanation of a shape of a detailed model (no corresponding standard) of a semiconductor integrated circuit 100M, as the thermal resistance analysis model according to the comparative example to which the CFD is applied. More specifically, the detailed model is a model having a low abstraction level, since sizes, physical property values, etc. of a semiconductor chip and each component composing the semiconductor integrated circuit 100M are included. Since the detailed model has a finest precision as the heat generation model but includes internal detailed information, the detailed model is difficult to be made available actually, and quality thereof is different from company to company since there is no standard. Moreover, the detailed model takes time for calculation and has low compatibility between analysis tools, since it is the detailed model.

The detailed model according to the comparative example has also a difficulty in availability. Moreover, the two-resistance model according to the comparative example cannot be used for detailed designs. On the other hand, the DELPHI model according to the comparative example is a realistic model, but is difficult to respond to the local heat generation.

(At Time of Whole Heat Generation)

Figure 7:
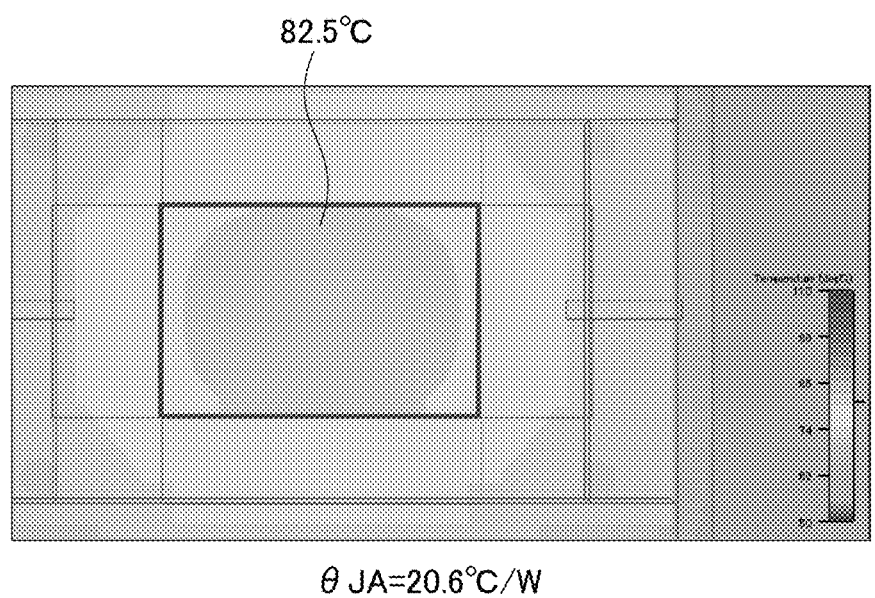
FIG. 7 shows a numerical example of a junction temperature and a thermal resistance θJA of a semiconductor chip at a time of a whole heat generation calculated by applying the detailed model, as the comparative example.

FIG. 7 shows a numerical example of a junction temperature and a thermal resistance θJA of a semiconductor chip at a time of a whole heat generation calculated by applying the detailed model, as the comparative example. In the example shown in FIG. 7, the junction temperature is 82.5 degree Celsius (° C.), and the thermal resistance θJA is 20.6° C./W.

Figure 8:
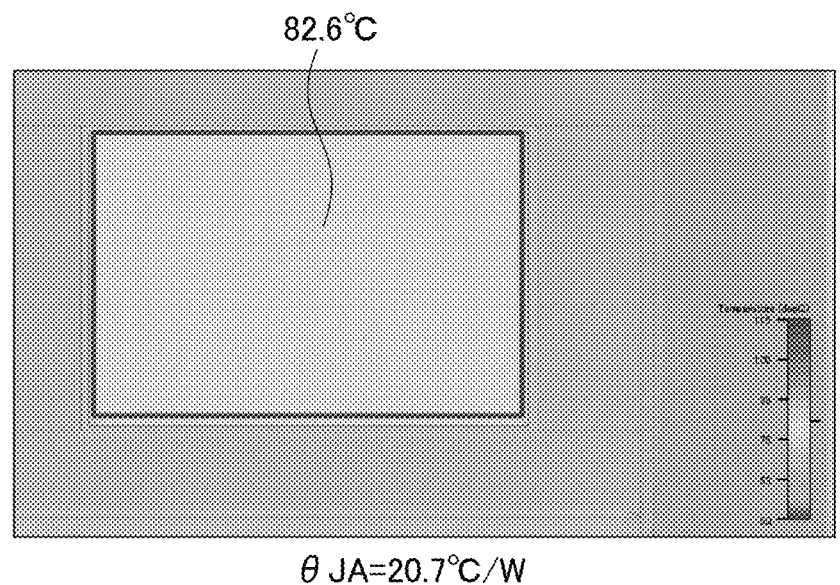
FIG. 8 shows a numerical example of a junction temperature and a thermal resistance θJA of a semiconductor chip at a time of a whole heat generation calculated by applying the DELPHI model, as the comparative example.

FIG. 8 shows a numerical example of a junction temperature and a thermal resistance θJA of a semiconductor chip at a time of a whole heat generation calculated by applying the DELPHI model, as the comparative example. In the example shown in FIG. 8, the junction temperature is 82.6 degree Celsius (° C.), and the thermal resistance θJA is 20.7° C./W.

The calculated result of the junction temperature and the thermal resistance θJA of the semiconductor chip at the time of the whole heat generation calculated by applying the DELPHI model as the comparative example is substantially identical to the calculated result of the detailed model, and therefore the precision as the heat generation model at the time of the whole heat generation is satisfactory.

(At Time of Local Heat Generation)

Figure 9:
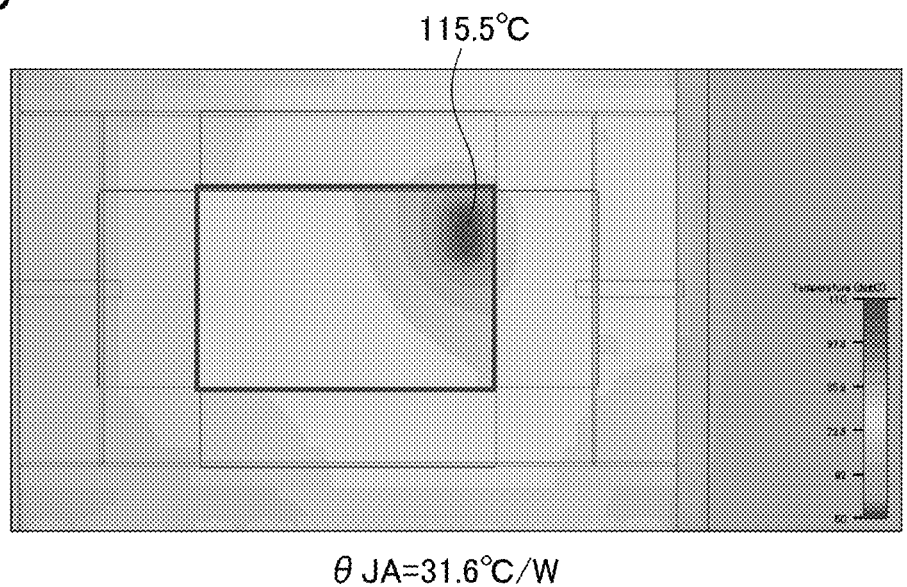
FIG. 9 shows a numerical example of a junction temperature and a thermal resistance θJA of a semiconductor chip at a time of a local heat generation calculated by applying the detailed model, as the comparative example.

FIG. 9 shows a numerical example of a junction temperature and a thermal resistance θJA of a semiconductor chip at a time of a local heat generation calculated by applying the detailed model, as the comparative example. In FIG. 9, a case of a local heat generation at which only one channel generates heat is assumed, in the semiconductor chip including heat sources of a plurality of channels. In the example shown in FIG. 9, the maximum junction temperature is 115.5° C., and a thermal resistance θJA is 31.6° C./W.

Figure 10:
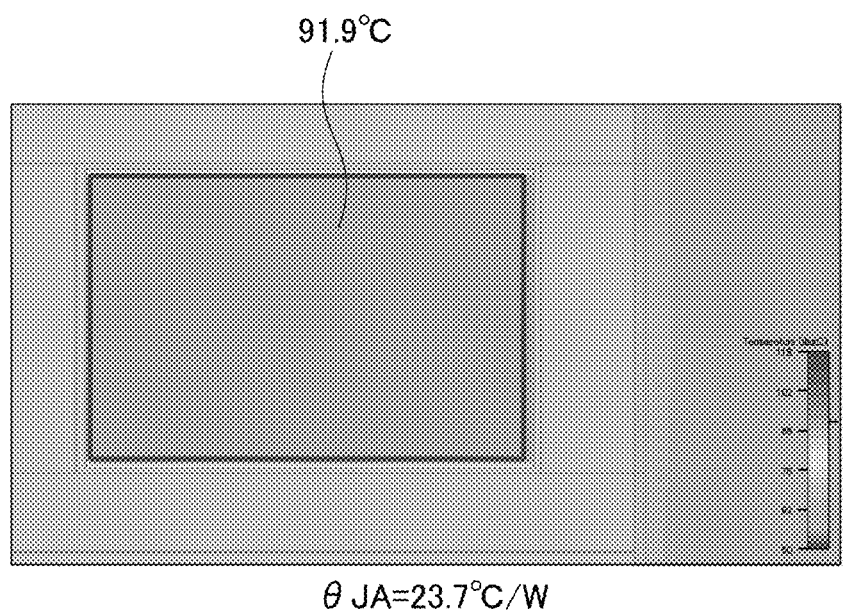
FIG. 10 shows a numerical example of a junction temperature and a thermal resistance θJA of a semiconductor chip at a time of a local heat generation calculated by applying the DELPHI model, as the comparative example.

FIG. 10 shows a numerical example of a junction temperature and a thermal resistance θJA of a semiconductor chip at a time of a local heat generation calculated by applying the DELPHI model, as the comparative example. In the example shown in FIG. 10, the junction temperature is 91.9 degree Celsius (° C.), and the thermal resistance θJA is 23.7° C./W.

The calculated result of the junction temperature and the thermal resistance θJA of the semiconductor chip at the time of the local heat generation calculated by applying the DELPHI model as the comparative example is greatly different from the calculated result of the detailed model, and therefore the precision as the heat generation model at the time of the whole heat generation is relatively low. Accordingly the DELPHI model cannot respond to the local heat generation.

(Comparative Example: DELPHI Model)

Figure 11A:
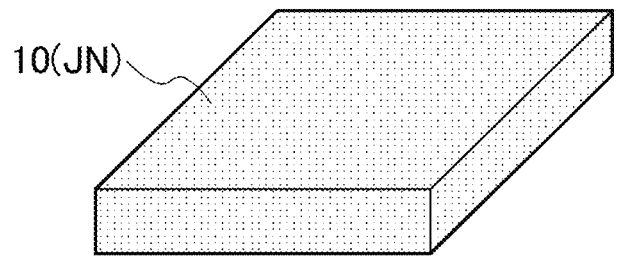
FIG. 11A is a bird's-eye view showing a semiconductor chip at the time of a whole heat generation to which the DELPHI model is applied, as the comparative example.
Figure 11B:
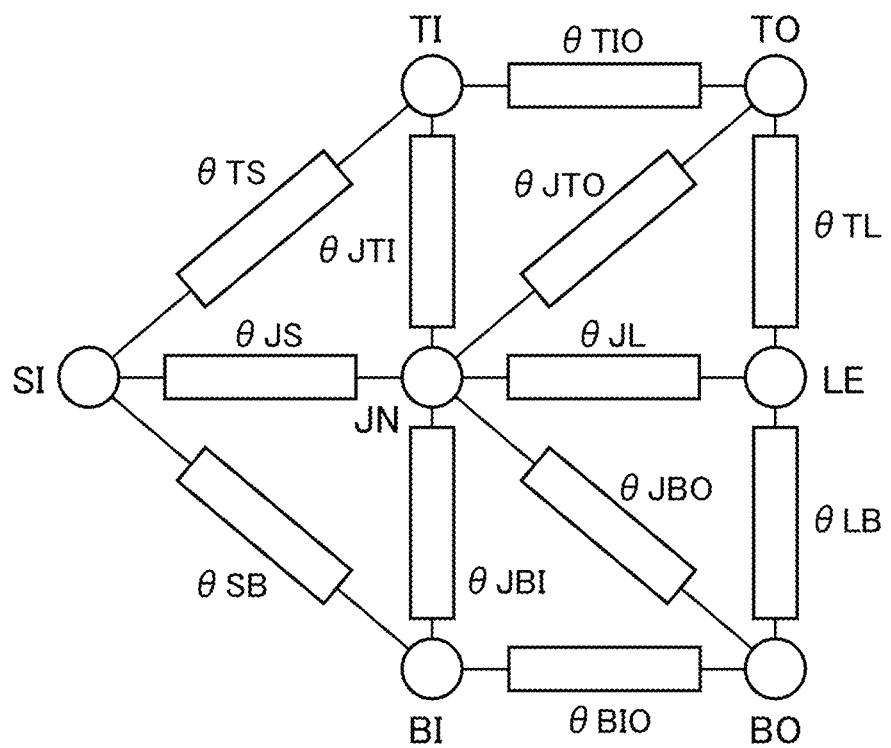
FIG. 11B is an explanatory diagram showing a shape of the DELPHI model corresponding to that in FIG. 11A.

As the comparative example, FIG. 11A shows a bird's-eye view configuration of a semiconductor chip 10 at a time of a whole heat generation to which the DELPHI model is applied, and FIG. 11B shows an explanation of a DELPHI model shape corresponding to FIG. 11A. As shown in FIG. 11A, the whole of the semiconductor chip 10 is shown as a junction node JN itself, in the semiconductor chip 10 at the time of the whole heat generation to which the DELPHI model is applied. The configuration shown in FIG. 11B for explaining the DELPHI model shape corresponding to FIG. 11A includes a model which expresses the semiconductor integrated circuit by a multi-thermal resistance network in the same manner as the shape of the DELPHI compact model (JESD15-4) shown in FIG. 5. Accordingly, the duplicated description is omitted.

(First Embodiment: Local DELPHI Model)

Figure 12A:
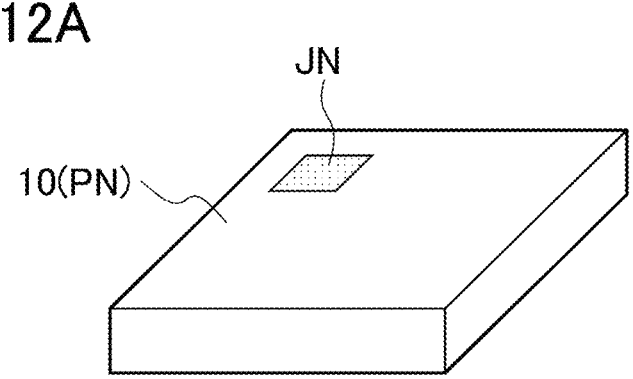
FIG. 12A is a bird's-eye view showing a semiconductor chip to which a Local DELPHI model is applied as a thermal resistance analysis model according to the first embodiment.
Figure 12B:
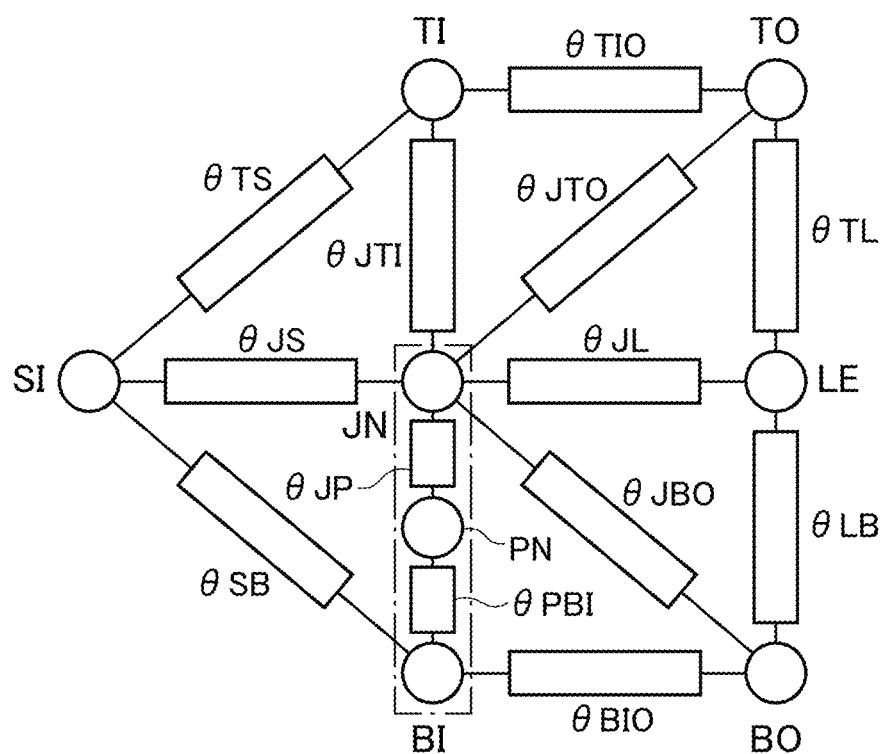
FIG. 12B is an explanatory diagram showing a shape of the Local DELPHI model corresponding to that in FIG. 12A.

As a thermal resistance analysis model according to a first embodiment, FIG. 12A shows a bird's-eye view configuration of a semiconductor chip 10 to which the Local DELPHI model is applied, and FIG. 12B shows an explanation of a shape of the Local DELPHI model corresponding to FIG. 12A.

In the thermal resistance analysis model according to the first embodiment, the Local DELPHI model expressing the local heat generation in the semiconductor chip 10 can be provided by adding one plate node PN. More specifically, as shown in FIG. 12A, in the thermal resistance analysis model according to the first embodiment, a local heat-generating portion in a junction portion, e.g. a power transistor, is expressed by a junction node JN; and a semiconductor chip 10 portion except for the local heat-generating portion is expressed by a plate node PN, in a semiconductor chip 10.

As the thermal resistance analysis model according to the first embodiment, the shape of the Local DELPHI model includes a model which expresses the semiconductor integrated circuit by the multi-thermal resistance network, as shown in FIG. 12B.

More specifically, as shown in FIG. 12B, the Local DELPHI model as the thermal resistance analysis model according to the first embodiment includes: a junction node JN; an added plate node PN; a top inner node TI; a top outer node TO; a bottom inner node BI; a bottom outer node BO; a side node SI; a lead node LE; a thermal resistance θJTI disposed between the junction node JN and the top inner node TI; a thermal resistance θJTO disposed between the junction node JN and the top outer node TO; a thermal resistance θJS disposed between the junction node JN and the side node SI; a thermal resistance θJL disposed between the junction node JN and the lead node LE; a thermal resistance θJP disposed between the junction node JN and the plate node PN; a thermal resistance θPBI disposed between the plate node PN and the bottom inner node BI; a thermal resistance θJBO disposed between the junction node JN and the bottom outer node BO; a thermal resistance θTIO disposed between the top inner node TI and the top outer node TO; a thermal resistance θTS disposed between the top inner node TI and the side node SI; a thermal resistance θTL disposed between the top outer node TO and the lead node LE; a thermal resistance θSB disposed between the side node SI and the bottom inner node BI; a thermal resistance θLB disposed between the lead node LE and the bottom outer node BO; and a thermal resistance θBIO disposed between the bottom inner node BI and the bottom outer node BO.

Moreover, the bottom inner node BI and the bottom outer node BO respectively correspond to an inside portion and an outside portion of the mounting substrate portion on which the semiconductor chip 10 is mounted, in the semiconductor integrated circuit, in the same manner as FIG. 3A.

Moreover, the top inner node TI and the top outer node TO respectively correspond to an inside portion and an outside portion of the upper surface case portion in which the semiconductor chip 10 is disposed, in the semiconductor integrated circuit, in the same manner as FIGS. 2A and 3B.

Moreover, the junction node JN corresponds to the junction portion which becomes the local heat source of the semiconductor chip 10, in the semiconductor integrated circuit, as shown in FIG. 12A.

Moreover, the added plate node PN corresponds to the semiconductor chips 10 (PN) except for the junction node JN which becomes the local heat source of the semiconductor chip 10, in the semiconductor integrated circuit, as shown in FIG. 12A.

Moreover, the side node SI and the lead node LE respectively correspond to a side portion of the case portion in which the semiconductor chip 10 is mounted and an disposing portion of the lead terminal, in the semiconductor integrated circuit, in the same manner as FIGS. 2A and 3D.

Moreover, the Local DELPHI model as the thermal resistance analysis model according to the first embodiment can express the local heat generation in the chip with sufficient precision by adding the one plate node PN, and by expressing the local heat-generating portion by the junction node JN and expressing the semiconductor chip 10 portion except for the local heat-generating portion by the plate node PN.

Figure 13:
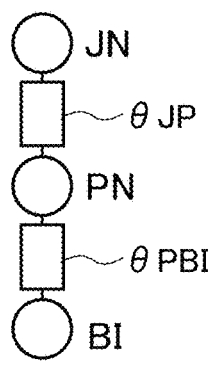
FIG. 13 is an explanatory diagram showing a shape between a junction node JN and a bottom inner node BI, in a Local DELPHI model to which a plate node PN is added as the thermal resistance analysis model according to the first embodiment.

FIG. 13 shows an explanation of a shape between the junction node JN and the bottom inner node BI, in the Local DELPHI model formed by adding the plate node PN, as the thermal resistance analysis model according to the first embodiment. FIG. 13 shows the shape shown by extracting the dashed line portion shown in FIG. 12B.

Figure 14:
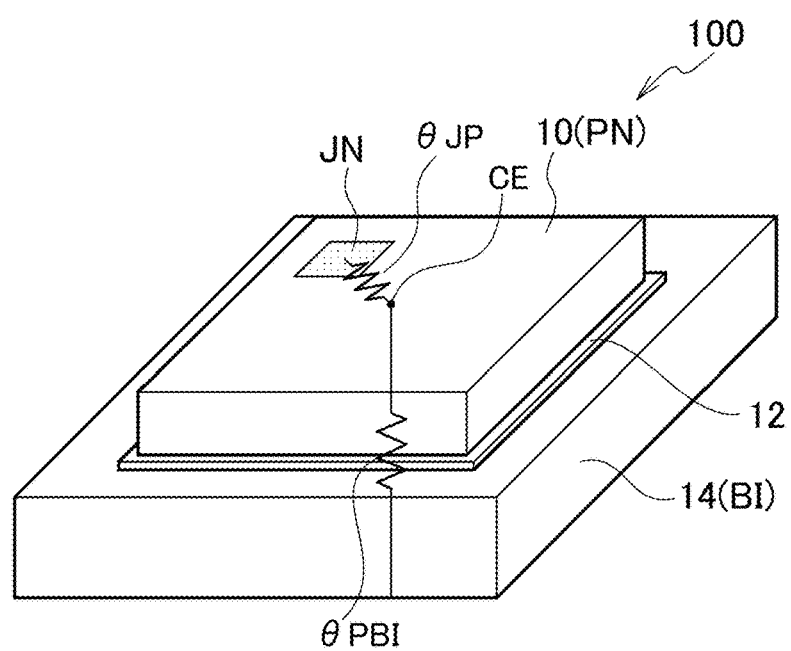
FIG. 14 is a bird's-eye view configuration diagram showing a semiconductor integrated circuit to which the Local DELPHI model is applied, as the thermal resistance analysis model according to the first embodiment, wherein the plate node PN is added to the Local DELPHI model.

FIG. 14 is a bird's-eye view configuration of a semiconductor integrated circuit to which the Local DELPHI model is applied, as the thermal resistance analysis model according to the first embodiment, wherein the plate node PN is added to the Local DELPHI model.

As shown in FIG. 14, as the thermal resistance analysis model according to the first embodiment, the semiconductor integrated circuit 100 which applies a Local DELPHI model includes a die 14, a die connecting region 12, and a semiconductor chip 10.

The semiconductor chip 10 is disposed on the die 14 via the die connecting region 12.

The die 14 constitutes an island, e.g. a metal layer, mounted on the substrate, and corresponds to the bottom inner node BI in the Local DELPHI model.

The die connecting region 12 is composed by including a soldering layer etc. used for connecting the semiconductor chip 10 to the die 14.

The local heat-generating portion of the semiconductor chip 10 is expressed by the junction node JN. The semiconductor chip 10 portion except for the local heat-generating portion (junction node JN) is expressed by the plate node PN, but the center CE of the semiconductor chip 10 substantially corresponds to the plate node PN. More specifically, the semiconductor chip 10 includes: the local heat-generating portion (junction node JN) composed by including the junction portion, e.g. a power transistor, for example; and the semiconductor chips 10 (plate node PN) except for the local heat-generating portion (JN).

The thermal resistance θJP is disposed between the junction node JN and the plate node PN (CE), and the thermal resistance θPBI is disposed between the plate node PN and the bottom inner node BI.

The Local DELPHI model as the thermal resistance analysis model according to the first embodiment can express the local heat generation in the chip with sufficient precision by adding one plate node PN and adding the network thereto.

(Chip Temperature Distribution)

Figure 15:
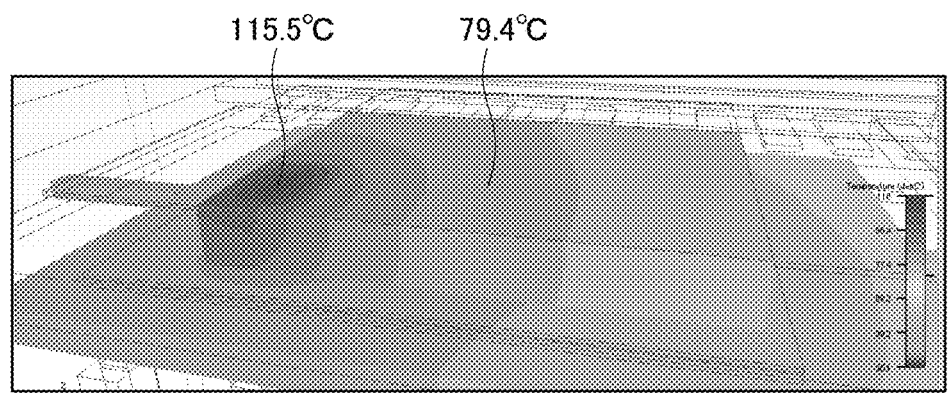
FIG. 15 is a schematic bird's-eye view showing a result of a chip temperature distribution simulation of the semiconductor chip to which the thermal resistance analysis model according to the first embodiment is applied.

FIG. 15 is a schematic bird's-eye view showing a result of a chip temperature distribution simulation of the semiconductor chip to which the thermal resistance analysis model according to the first embodiment is applied. As shown in FIG. 15, the highest temperature in the local heat-generating portion is approximately 115.5° C., and the temperature of a center portion of the semiconductor chip is approximately 79.4° C.

(Thermal Flux of Junction Portion)

Figure 16:
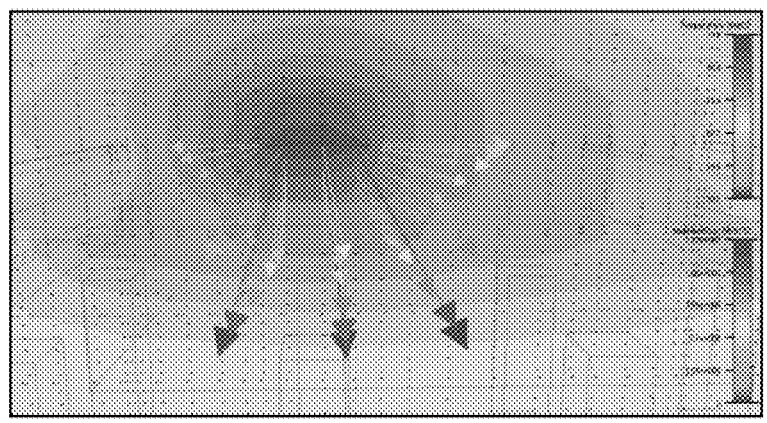
FIG. 16 is a schematic diagram of a result of a heat flux simulation near a local heat-generating portion of the semiconductor chip to which the thermal resistance analysis model according to the first embodiment is applied.

FIG. 16 is a schematic diagram of a result of a heat flux simulation near the junction node JN corresponding to the local heat-generating portion of the semiconductor chip to which the thermal resistance analysis model according to the first embodiment is applied. It is proved that almost all flows into a lower side (bottom inner node side, e.g., substrate side, e.g. Cu) by vector-displaying the thermal flux, as shown in FIG. 16. A heat flow rate of flowing into the lower side is approximately 2.94 W from a simulation result of CFD. On the basis of the above, if the thermal resistance θJP to be added is calculated, the thermal resistance θJP is expressed by θJP=(115.5° C.−79.4° C.)/2.94 W=12.3° C./W.

(Aspect of Drawing Isothermal Line from Junction Node JN)

Figure 17A:
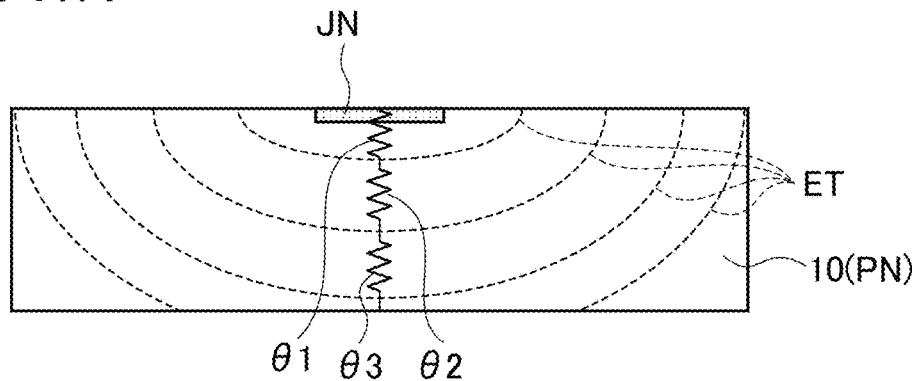
FIG. 17A is a schematic diagram showing a semiconductor chip 10 (PN) in a cross sectioned direction for explaining an aspect of drawing the isothermal line ET from a junction node JN, in the semiconductor integrated circuit to which the thermal resistance analysis model according to the first embodiment is applied.

FIG. 17A shows a schematic diagram showing a semiconductor chip 10 (PN) in a cross sectioned direction for explaining an aspect of drawing the isothermal line ET from a junction node JN, in the semiconductor integrated circuit to which the thermal resistance analysis model according to the first embodiment is applied. The isothermal line ET is shown by the dashed line as shown in FIG. 17A. The thermal resistance between the junction node JN and the isothermal line ET close to the junction node JN is expressed, for example by reference numeral θ1, and the thermal resistances between the isothermal lines ET are expressed, for example by reference numerals θ2 and θ3 one after another.

Figure 17B:
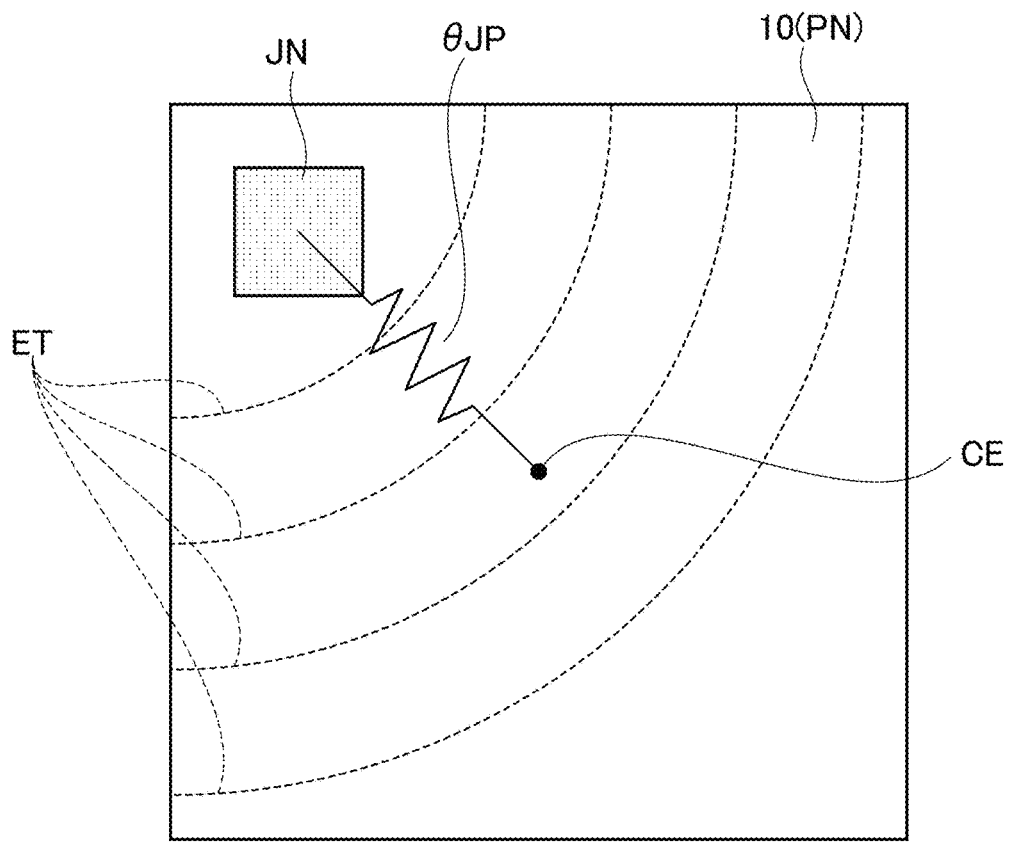
FIG. 17B is a schematic top view diagram showing the semiconductor chip for explaining the aspect of drawing the isothermal line from the junction node JN, in the semiconductor integrated circuit corresponding to FIG. 14 to which the thermal resistance analysis model according to the first embodiment is applied.

FIG. 17B is a schematic top view diagram showing the semiconductor chip 10 (PN) for explaining the aspect of drawing the isothermal line from the junction node JN, in the semiconductor integrated circuit corresponding to FIG. 14 to which the thermal resistance analysis model according to the first embodiment is applied. Similarly, the isothermal line ET is shown by the dashed line as shown in FIG. 17B.

As shown in FIG. 17, the isothermal lines ET are drawn from the junction node JN to the center CE of the semiconductor chip 10 (PN), and thereby the thermal resistance θJP up to the center CE is calculated. The center CE of the semiconductor chip 10 (PN) substantially corresponds to the plate node PN.

In the Local DELPHI model to which the thermal resistance analysis model according to the first embodiment is applied, surface optimization of the upper surface of the semiconductor chip 10 (PN) can be realized by drawing the isothermal lines ET from the junction node JN at an arbitrary position to the center CE of the semiconductor chip 10 (PN), and then calculating the thermal resistance θJP up to the center CE. Moreover, the thermal resistance from the center CE of the semiconductor chip 10 (PN) to the bottom inner node BI is expressed by θPBI.

(Concrete Examples of Thermal Resistance Analysis of Each Part)

FIG. 18 shows a result of a thermal resistance analysis of each unit in a semiconductor integrated circuit to which the Local DELPHI model is applied as the thermal resistance analysis model according to the first embodiment. As shown in FIG. 18, an analysis result of each of the thermal resistances disposed between the start point node and the end point node is shown by the numerical value (° C./W). For example, the thermal resistance between the top inner node TI and the top outer node TO is 1480.252 (° C./W). The thermal resistance between plate node PN and the junction node JN is 12.3 (° C./W). The thermal resistance between the plate node PN and the bottom inner node BI is 2.26567 (° C./W).

(Numerical Example of Thermal Resistance $\theta_{JA}$)

Figure 19A:
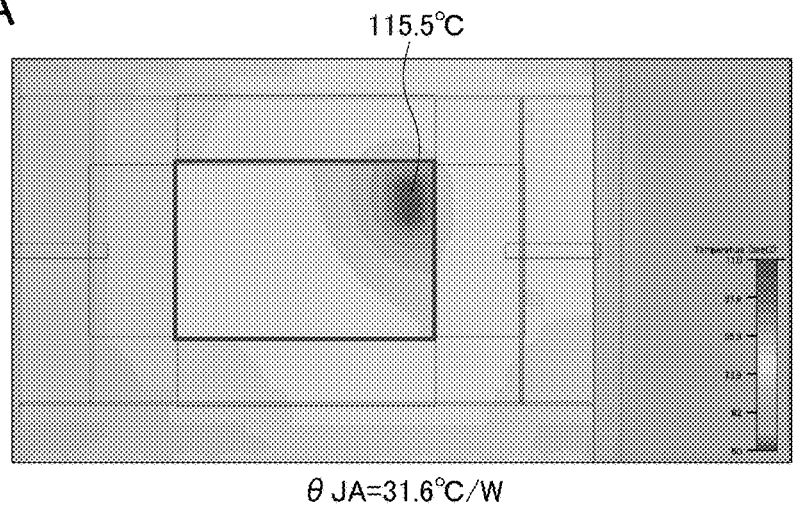
FIG. 19A shows a numerical example of a junction temperature and a thermal resistance θJA of a semiconductor chip at a time of a local heat generation calculated by applying the detailed model, as the comparative example.

FIG. 19A shows a numerical example of a junction temperature and a thermal resistance $\theta_{JA}$ of a semiconductor chip at a time of the local heat generation calculated by applying the detailed model, as the comparative example. In the detailed model, the maximum junction temperature which is approximately 115.5° C. and the thermal resistance θJA which is approximately 31.6° C./W are obtained.

Figure 19B:
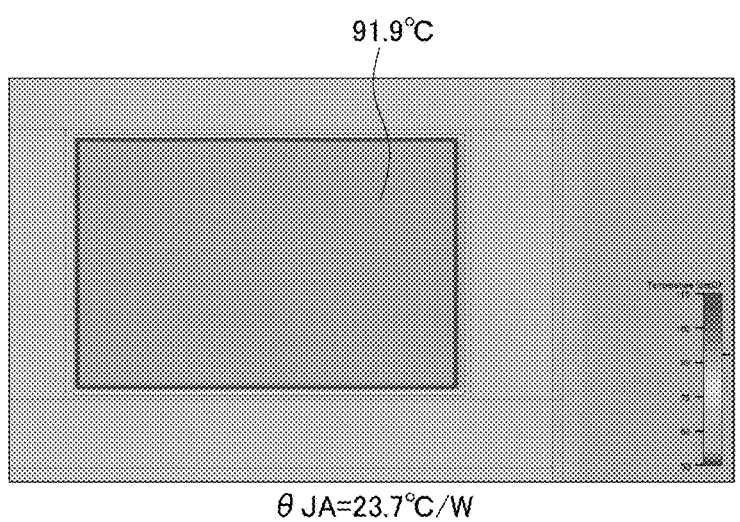
FIG. 19B shows a numerical example of a junction temperature and a thermal resistance θJA of a semiconductor chip at a time of a whole heat generation calculated by applying the DELPHI model, as the comparative example.

FIG. 19B shows a numerical example of a junction temperature and a thermal resistance $\theta_{JA}$ of a semiconductor chip at a time of the whole heat generation calculated by applying the DELPHI model, as the comparative example. In the DELPHI model, the maximum junction temperature which is approximately 91.9° C. and the thermal resistance θJA which is approximately 23.7° C./W are obtained.

Figure 19C:
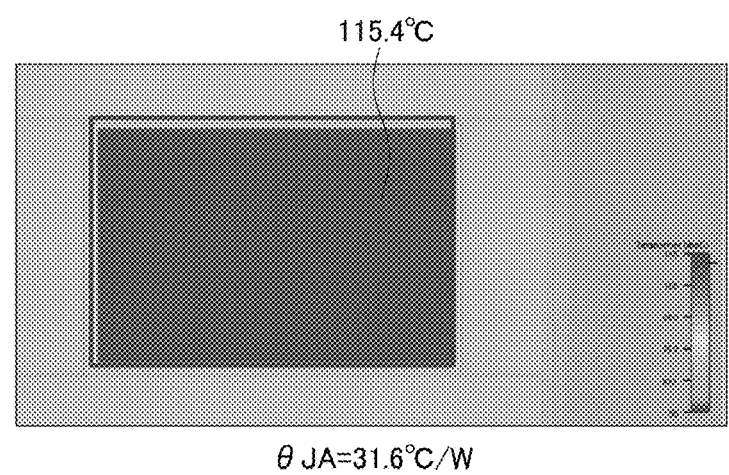
FIG. 19C shows a numerical example of a junction temperature and a thermal resistance θJA of a semiconductor chip to which the Local DELPHI model is applied as the thermal resistance analysis model according to the first embodiment.

On the other hand, FIG. 19C shows a numerical example of a junction temperature and a thermal resistance $\theta_{JA}$ of a semiconductor chip to which the Local DELPHI model is applied as the thermal resistance analysis model according to the first embodiment. In the local DELPHI model, the maximum junction temperature which is approximately 115.4° C. and the thermal resistance $\theta_{JA}$ which is approximately 31.6° C./W are obtained.

Since the result calculated by applying the DELPHI model corresponds to the numerical example of the junction temperature and the thermal resistance $\theta_{JA}$ of the semiconductor chip at the time of the whole heat generation, an error is relatively large, as compared with the result calculated by applying the detailed model.

On the other hand, since the result calculated by applying the Local DELPHI model as the thermal resistance analysis model according to the first embodiment corresponds to the numerical example of the junction temperature and the thermal resistance $\theta_{JA}$ of the semiconductor chip at the time of the local heat generation by adding the plate node PN, an error is relatively small, as compared with the result calculated by applying the detailed model, and therefore a satisfactory result can be obtained.

(Heat Radiation Performance of Substrate)

FIG. 20 shows numerical examples calculated by applying the detailed model and the DELPHI model as the comparative example; and numerical examples calculated by applying the Local DELPHI model as the thermal resistance analysis model according to the first embodiment; in a cases of using various substrate specifications and using the whole surface heat source and the local heat source.

The substrate specifications will now be explained with reference to FIGS. 21A, 21B, and 21C.

Figure 21A:
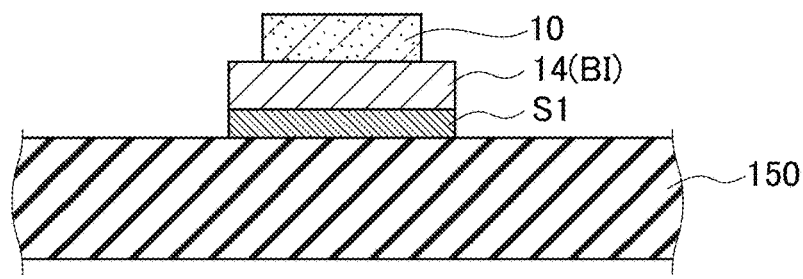
FIG. 21A is a schematic cross-sectional structure diagram showing a 1s (one layer) substrate, in the substrate specification shown in FIG. 20.
Figure 21B:
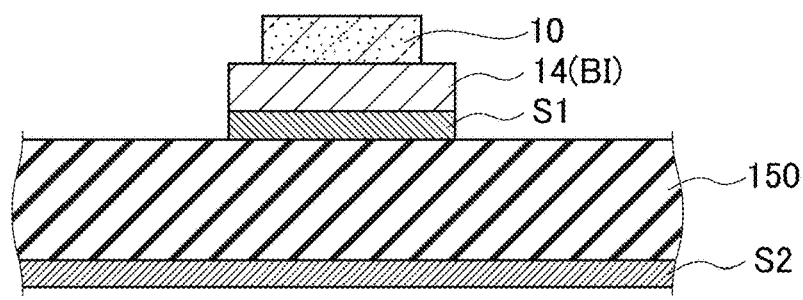
FIG. 21B is a schematic cross-sectional structure diagram showing a 2s (two layer) substrate, in the substrate specification shown in FIG. 20.
Figure 21C:
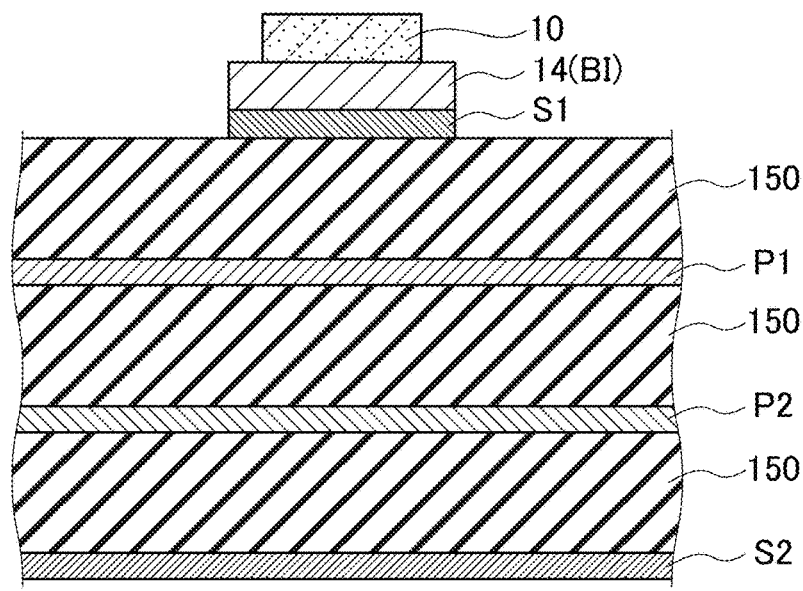
FIG. 21C is a schematic cross-sectional structure diagram showing a 2s2p (four layer) substrate, in the substrate specification shown in FIG. 20.

As the substrate specifications shown in FIG. 20, FIG. 21A shows a schematic cross-sectional structure of a 1s (one layer) substrate, FIG. 21B shows a schematic cross-sectional structure of a 2s (two layer) substrate, and FIG. 21C shows a schematic cross-sectional structure of a 2s2p (four layer) substrate.

The 1s (one layer) substrate includes: an insulating substrate 150; and a first electrode layer (footprint) S1 disposed on the insulating substrate 150, as shown in FIG. 21A. The semiconductor chip 10 is disposed on the first electrode layer (footprint) S1 via a die 14 (BI).

As shown in FIG. 21B, the 2s (two layer) substrate includes: an insulating substrate 150; a first electrode layer (footprint) S1 disposed on the insulating substrate 150; and a second electrode layer S2 disposed on a back side surface opposite to the first electrode layer (footprint) S1 of the insulating substrate 150.

As shown in FIG. 21C, the 2s2p (four layer) substrate includes: an insulating substrate 150; a first electrode layer (footprint) S1 disposed on the insulating substrate 150; a second electrode layer S2 disposed on a back side surface opposite to the first electrode layer (footprint) S1 of the insulating substrate 150; a first plane electrode layer P1 embedded in an inside of the insulating substrate 150; and a second plane electrode layer P2 embedded in an inside of the insulating substrate 150 between the first plane electrode layer P1 and the second electrode layer S2. The semiconductor chip 10 is disposed on the first electrode layer (footprint) S1 via a die 14 (BI). The second electrode layer S2 can be applied as a ground electrode layer (earth electrode layer). The first plane electrode layer P1 may be maintained at a ground potential (GND), and the second plane electrode layer P2 may be maintained at a potential of a power supply voltage $V_{CC}$.

For example, assuming heat sources of a plurality of channels, the "1ch" of heat source corresponds to a case of only one of channels generates heat. The heat sources of the plurality of channels corresponds to a case of having a plurality of junction nodes, in a configuration where a plurality of power transistors are disposed in parallel to each other, for example.

Reference numeral Tj denotes a junction temperature. Reference numeral $T_{PN}$ denotes a die temperature which is a temperature of the die 14 called a bottom inner or an island. Reference numeral Ta denotes an ambient temperature. Reference numeral P (W) denotes power consumption. Reference numeral θJA denotes a thermal resistance indicating a thermal resistance between the junction node JN and the periphery environment. In FIG. 20, an error of the thermal resistance θJA with the detailed model is also shown percentagewise.

In the case of the heat source of the whole heat generation, there is no error in the 2s2p (four layer) structure and the 2s (two layer) structure if a difference between the detailed model and the DELPHI model is examined using heat radiation performance of the substrate as a parameter, as shown in FIG. 20, but there is an error of approximately 3% in the 1s (one layer) structure since the heat radiation performance of the substrate is relatively low.

In the case of the local heat source (1ch), if a difference between the detailed model and the DELPHI model is examined using the heat radiation performance of the substrate as a parameter, as shown in FIG. 20, there is an error of approximately 33% in the 2s2p (four layer) structure, there is an error of approximately 29% in the 2s (two layer) structure, and there is an error of approximately 12% in the 1s (one layer) structure. On the other hand, if a difference between the detailed model and the Local DELPHI model is examined, there is no error in the 2s2p (four layer) structure, but there is an error of approximately 3% in the 2s (two layer) structure, and there is also an error of approximately 7% in the 1s (one layer) structure.

Although there is observed a tendency for the error to be relatively increased as the heat radiation performance of the substrate becomes relatively low in the Local DELPHI model, a range of the error with the detailed model is equal to or less than approximately 10%.

Accordingly, it is sufficiently applicable also to a case where the heat radiation performance of the substrate is changed, by applying the Local DELPHI model as the thermal resistance analysis model according to the first embodiment.

Although there is observed a tendency for the error to be relatively increased due to increasing of a heat radiation to the upper surface of the semiconductor chip (decreasing of radiation ability to the substrate side of the bottom surface), the influence can be reduced by adding the network at the upper surface side of the semiconductor chip.

Figure 22:
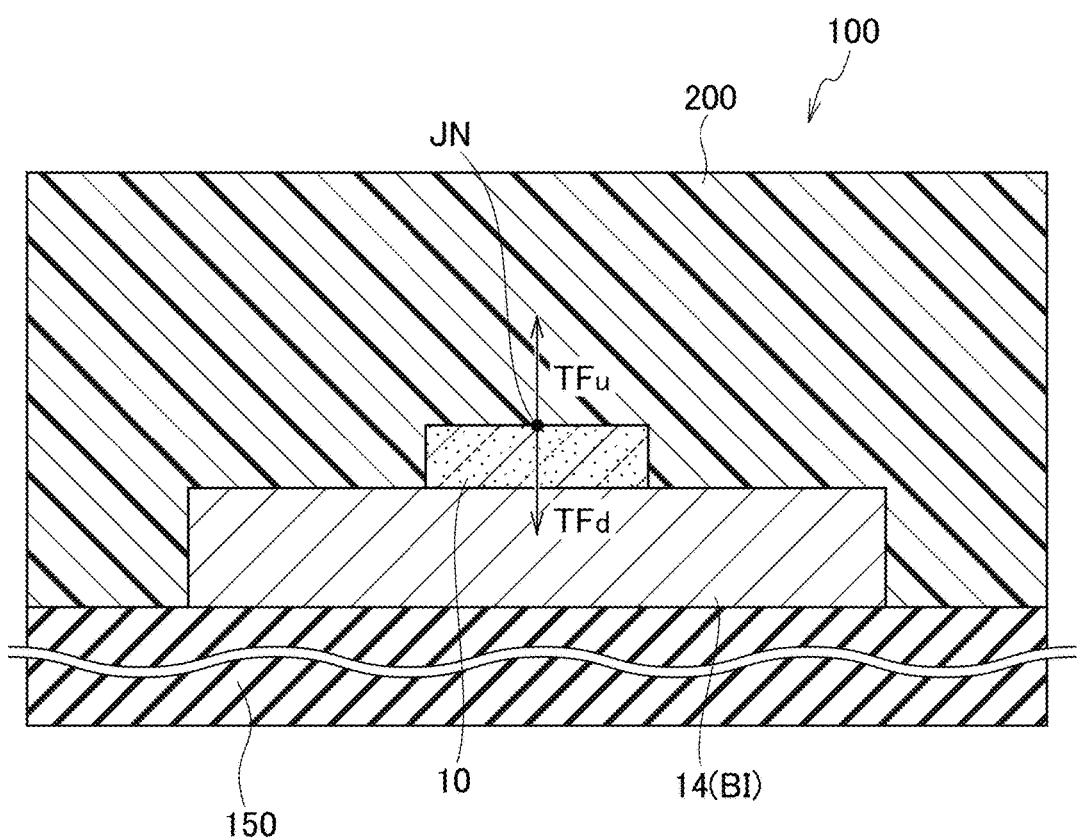
FIG. 22 is an explanatory diagram showing a semiconductor integrated circuit in consideration of a heat radiation in a top surface direction of the semiconductor integrated circuit at a time of a local heat generation, in the Local DELPHI model as the thermal resistance analysis model according to the first embodiment.

FIG. 22 shows an explanatory of the semiconductor integrated circuit 100 in consideration of a heat radiation in a top surface direction of the semiconductor chip at a time of the local heat generation, in the Local DELPHI model as the thermal resistance analysis model according to the first embodiment. As shown in FIG. 22, both of a thermal flow $TF_u$ and a thermal flow $TF_d$ are taken into consideration. The thermal flow $TF_u$ is a thermal flow in a top surface direction via the resin molding layer 200 from the junction node JN as a local heat source of the semiconductor chip 10. The thermal flow $TF_d$ is a thermal flow in an insulating substrate 150 direction via the semiconductor chip 10 and the die 14. More specifically, the error can be reduced by adding the network at the upper surface side of the semiconductor chip.

According to the Local DELPHI model to which the node is added as a thermal resistance analysis model according to the first embodiment, the local heat generation can be modeled.

According to the first embodiment, there can be provided: the thermal resistance analysis model with satisfactory precision as a thermal resistance analysis model of locally heat-generating semiconductor integrated circuits; and the semiconductor integrated circuit to which such a thermal resistance analysis model is applied.

[Second Embodiment: Example of Plurality of Local Heat Generations]

Figure 23A:
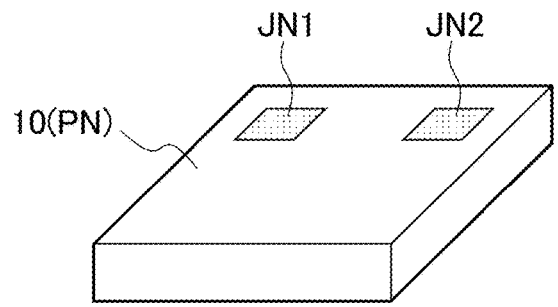
FIG. 23A is a bird's-eye view showing a semiconductor chip to which a Local DELPHI model which expresses a plurality of local heat generations is applied, as the thermal resistance analysis model according to a second embodiment.
Figure 23B:
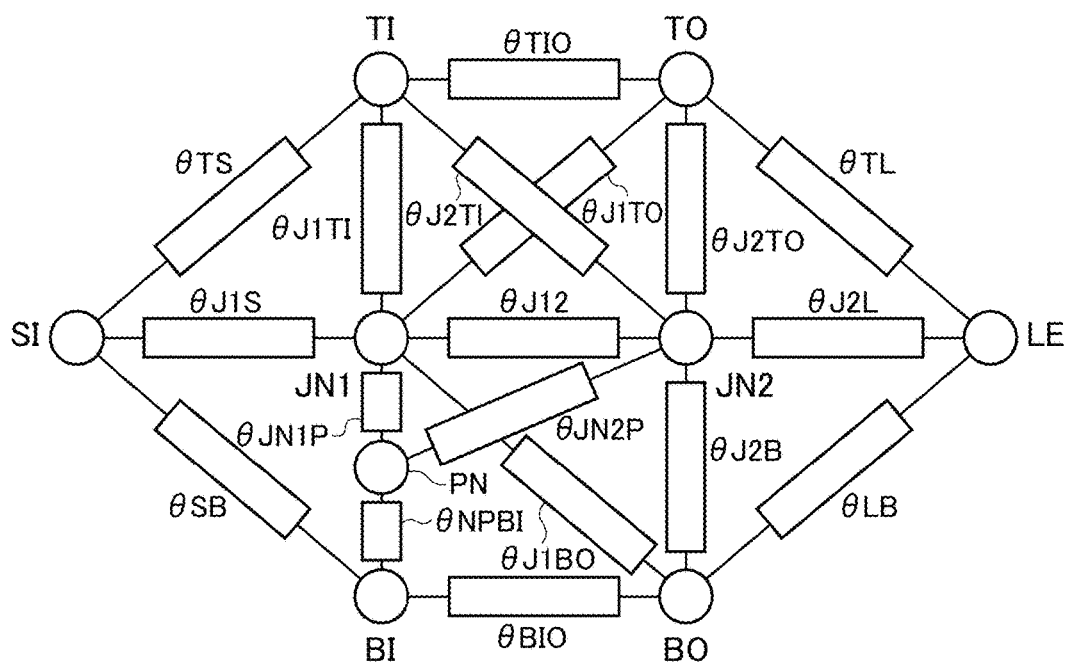
FIG. 23B is an explanatory diagram showing a shape portion of the Local DELPHI model which expresses the plurality of the local heat generations, as the thermal resistance analysis model according to the second embodiment.

FIG. 23A shows a bird's-eye view configuration of a semiconductor chip 10 to which the Local DELPHI model is applied which expresses an example of a plurality of local heat generations (i.e., to which a plurality of junction nodes JN1 and JN2 and the plate node PN are added), as a thermal resistance analysis model according to a second embodiment, and FIG. 23B shows an explanation of a shape portion of the Local DELPHI model.

In the thermal resistance analysis model according to the second embodiment, the Local DELPHI model expressing the plurality of the local heat generations in a chip can also be provided by adding two junction nodes JN1 and JN2 and the plate node PN. More specifically, as shown in FIG. 23A, in the thermal resistance analysis model according to the second embodiment, the local heat-generating portions in respective junction portions, e.g. two power transistors, in the semiconductor chip 10 are expressed by the junction nodes JN1 and JN2, and the semiconductor chip 10 portion except for the local heat-generating portions is expressed by the plate node PN.

As shown in FIG. 23B, the shape of the Local DELPHI model which expresses the plurality of the local heat generations in the chip as the thermal resistance analysis model according to the second embodiment includes a model which expresses the semiconductor integrated circuit by a multi-thermal resistance network.

More specifically, as shown in FIG. 23B, the Local DELPHI model expressing the plurality of the local heat generations as the thermal resistance analysis model according to the second embodiment includes: a junction node JN1; a junction node JN2; a plate node PN; a top inner node TI; a top outer node TO; a bottom inner node BI; a bottom outer node BO; a side node SI; a lead node LE; a thermal resistance θJ1TI disposed between the junction node JN1 and the top inner node TI; a thermal resistance θJ1TO disposed between the junction node JN1 and the top outer node TO; a thermal resistance θJ1S disposed between the junction node JN1 and the side node SI; a thermal resistance θJ12 disposed between the junction node JN1 and the junction node JN2; a thermal resistance θJ2TI disposed between the junction node JN2 and the top inner node TI; a thermal resistance θJ2TO disposed between the junction node JN2 and the top outer node TO; a thermal resistance θJ2L disposed between the junction node JN2 and the lead node LE; a thermal resistance θJ2B disposed between the junction node JN2 and the bottom outer node BO; a thermal resistance θJN2P disposed between the junction node JN2 and the plate node PN; a thermal resistance θJN1P disposed between the junction node JN1 and the plate node PN; a thermal resistance θNPBI disposed between the plate node PN and the bottom inner node BI; a thermal resistance θJ1BO disposed between the junction node JN1 and the bottom outer node BO; a thermal resistance θTIO disposed between the top inner node TI and the top outer node TO; a thermal resistance θTS disposed between the top inner node TI and the side node SI; a thermal resistance θTL disposed between the top outer node TO and the lead node LE; a thermal resistance θSB disposed between the side node SI and the bottom inner node BI; a thermal resistance θLB disposed between the lead node LE and the bottom outer node BO; and a thermal resistance θBIO disposed between the bottom inner node BI and the bottom outer node BO.

Moreover, the bottom inner node BI and the bottom outer node BO respectively correspond to an inside portion and an outside portion of the mounting substrate portion on which the semiconductor chip 10 is mounted, in the semiconductor integrated circuit, in the same manner as FIG. 3A.

Moreover, the top inner node TI and the top outer node TO respectively correspond to an inside portion and an outside portion of the upper surface case portion in which the semiconductor chip 10 is disposed, in the semiconductor integrated circuit, in the same manner as FIGS. 2A and 3B.

Moreover, the junction nodes JN1 and JN2 correspond to the junction portion which becomes the plurality of the local heat sources of the semiconductor chip 10, in the semiconductor integrated circuit, as shown in FIG. 23A.

Moreover, the added plate node PN corresponds to the semiconductor chips 10 (PN) except for the junction nodes JN1 and JN2 which become the local heat sources of the semiconductor chip 10, in the semiconductor integrated circuit, as shown in FIGS. 23A and 23B.

Moreover, the side node SI and the lead node LE respectively correspond to a side portion of the case portion in which the semiconductor chip 10 is mounted and an disposing portion of the lead terminal, in the semiconductor integrated circuit, in the same manner as FIGS. 2A and 3D.

The Local DELPHI model which expresses the plurality of the local heat generations in the chip as the thermal resistance analysis model according to the second embodiment can express the plurality of the local heat generations in the chip with sufficient precision by expressing the local heat-generating portions by the junction nodes JN1 and JN2 and expressing the semiconductor chip 10 portion except for the local heat-generating portion by the plate node PN.

(Concrete Example)

Figure 24A:
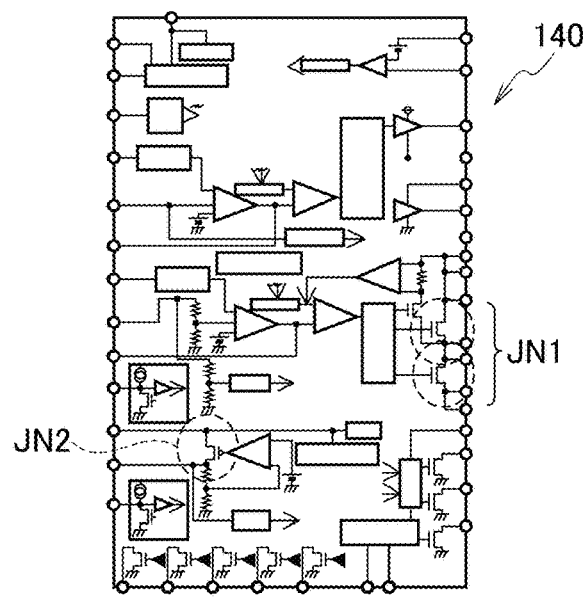
FIG. 24A is a schematic plain diagram of an integrated circuit for system power supply to which the Local DELPHI model which expresses the plurality of the local heat generations is applied, as the thermal resistance analysis model according to the second embodiment.
Figure 24B:
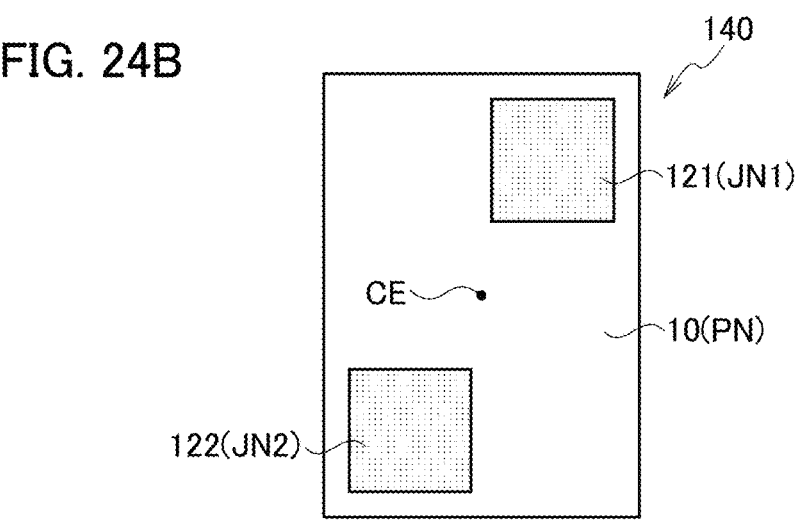
FIG. 24B is a schematic plain diagram showing a DC/DC converter block and an LDO regulator block of which heat generation profiles respectively are different from each other, in the integrated circuit for system power supply corresponding to FIG. 24A.
Figure 24C:
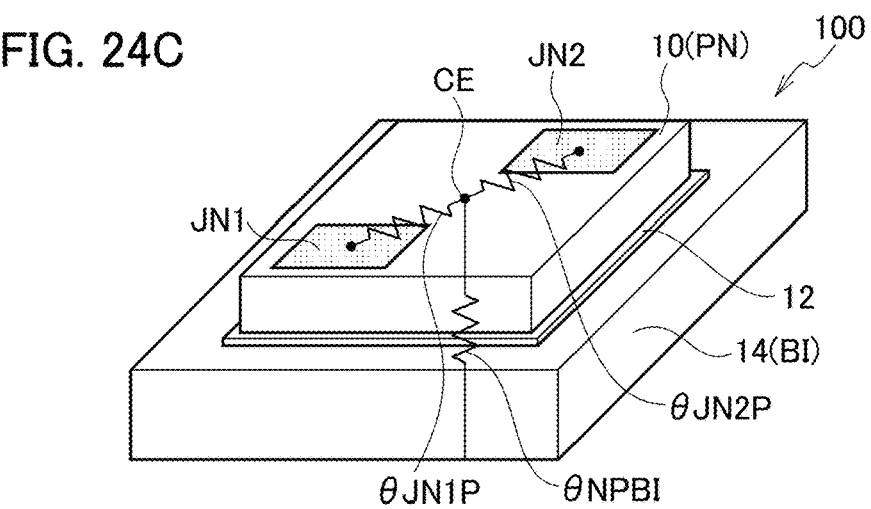
FIG. 24C is a bird's-eye view showing a semiconductor integrated circuit to which the Local DELPHI model which expresses the plurality of the local heat generations is applied, as the thermal resistance analysis model according to the second embodiment.

FIG. 24A shows a schematic plane configuration of an integrated circuit for system power supply 140, as a concrete example to which the Local DELPHI model which expresses the plurality of the local heat generations in the semiconductor chip is applied as the thermal resistance analysis model according to the second embodiment. FIG. 24B shows a schematic plane configuration of a DC/DC converter block 121 (JN1) and an LDO regulator block 122 (JN2) of which heat generation profiles are different from each other, in the integrated circuit for system power supply 140 corresponding to FIG. 24A. FIG. 24C shows a bird's-eye view configuration of a semiconductor integrated circuit 100 to which the Local DELPHI model which expresses the plurality of the local heat generations is applied, as the thermal resistance analysis model according to the second embodiment. Although the junction nodes JN1 and JN2 are shown in FIG. 24A, a detailed explanation of each of other parts is omitted.

As shown in FIG. 24C, the semiconductor integrated circuit 100 to which the Local DELPHI model which expresses the plurality of the local heat generations is applied as the thermal resistance analysis model according to the second embodiment includes: a die 14; a die connecting region 12, and a semiconductor chip 10.

The semiconductor chip 10 is disposed on the die 14 via the die connecting region 12.

The die 14 constitutes an island, e.g. a metal layer, mounted on the substrate, and corresponds to the bottom inner node BI in the Local DELPHI model.

The die connecting region 12 is composed by including a soldering layer etc. used for connecting the semiconductor chip 10 to the die 14.

The local heat-generating portions of the semiconductor chip 10 are respectively expressed by the junction nodes JN1 and JN2. The semiconductor chip 10 portion except for the local heat-generating portions (junction nodes JN1 and JN2) is expressed by the plate node PN, but the center CE of the semiconductor chip 10 substantially corresponds to the plate node PN.

In the integrated circuit for system power supply 140, as shown in FIGS. 24A and 24B, the respective local heat generations are generated mainly in respective power transistor portions of the DC/DC converter block 121 (JN1) and the LDO regulator block 122 (JN2). Accordingly, the thermal resistance θJN1P is disposed between the junction node JN1 corresponding to the DC/DC converter block 121 and the center CE of the semiconductor chip 10, and the thermal resistance θJN2P is disposed between the junction node JN2 corresponding to the LDO regulator block 122 and the center CE of the semiconductor chip 10. The thermal resistance θNPBI is disposed between the plate node PN and the bottom inner node BI.

The Local DELPHI model which expresses the plurality of the local heat generations as a thermal resistance analysis model according to the second embodiment can express the local heat generation in the chip with sufficient precision by adding one plate node PN to the junction nodes JN1 and JN2 and adding the network.

According to the second embodiment, there can be provided: the thermal resistance analysis model with satisfactory precision as a thermal resistance analysis model of the semiconductor integrated circuits which locally heat-generates at a plurality of places; and the semiconductor integrated circuit to which such a thermal resistance analysis model is applied.

[Third Embodiment: Example of Plurality of Local Heat Generations]

Figure 25A:
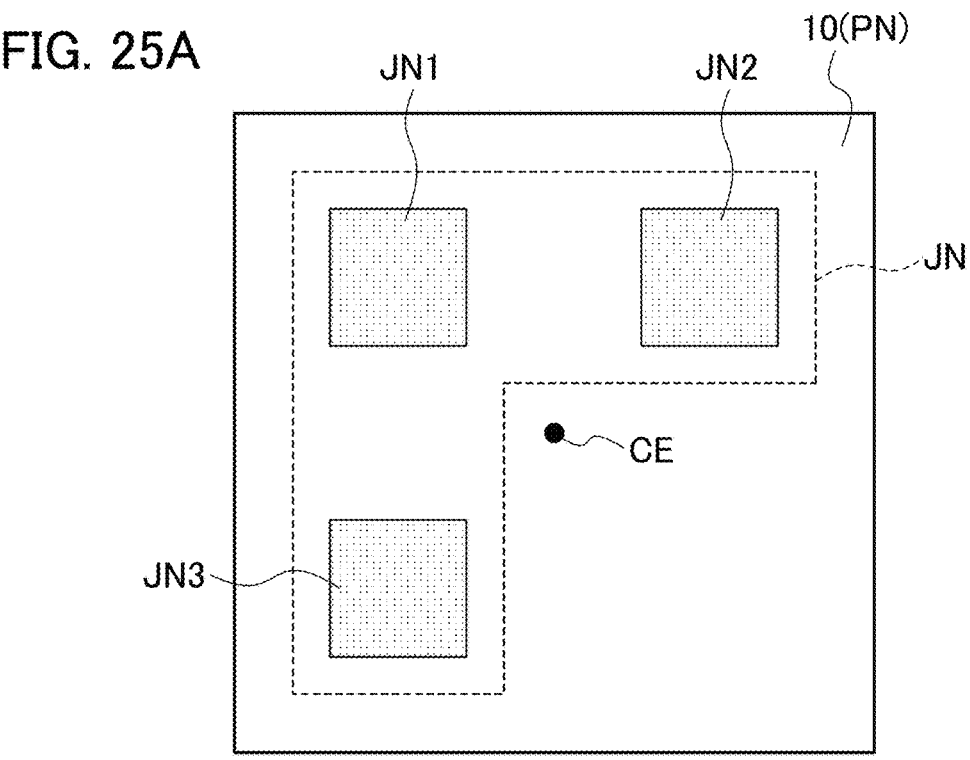
FIG. 25A is a schematic plain diagram showing a semiconductor chip to which a Local DELPHI model is applied in a case of including three junction nodes, as a thermal resistance analysis model according to a third embodiment.
Figure 25B:
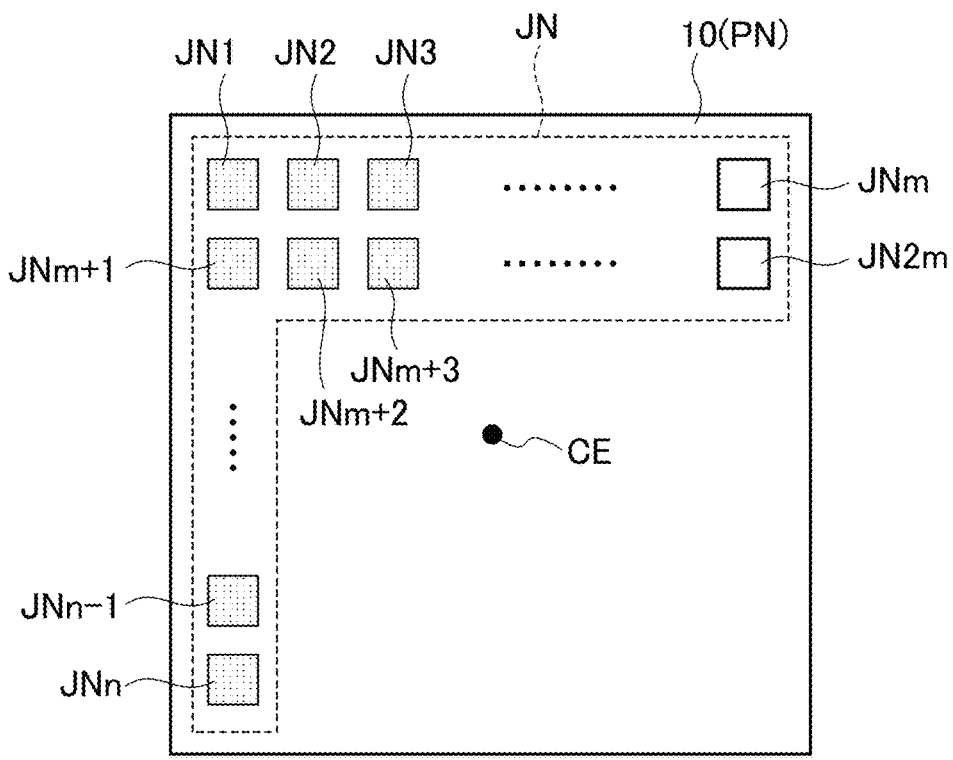
FIG. 25B is a schematic plain diagram showing a semiconductor chip to which the Local DELPHI model is applied in a case of including a plurality of the junction nodes, as the thermal resistance analysis model according to the third embodiment.

FIG. 25A shows a schematic plane configuration of a semiconductor chip 10 to which the Local DELPHI model is applied as a thermal resistance analysis model according to the third embodiment, in a case of including three junction nodes JN1, JN2, and JN3. FIG. 25B shows a schematic plane configuration of a semiconductor chip 10 to which the Local DELPHI model is applied as a thermal resistance analysis model according to the third embodiment, in a case of including a plurality of junction nodes JN1, JN2, . . . , JNm, . . . , JN2m, . . . , JNn.

In the case of including three junction nodes JN1, JN2, and JN3, it may express as the junction node JN into which three junction nodes JN1, JN2, and JN3 are merged, as shown in FIG. 25A. It can be handled in the same manner as the Local DELPHI model including the junction node JN and the plate node PN by expressing the junction node JN into which the three junction nodes JN1, JN2, and JN3 are merged.

Similarly, in the case of including the plurality of the junction nodes JN1, JN2, . . . , JNm, . . . , JN2m, . . . , JNn, it may express as the junction node JN into which the plurality of the junction nodes JN1, JN2, . . . , JNm, . . . , JN2m, . . . , JNn are merged, as shown in FIG. 25B. It can be handled in the same manner as the Local DELPHI model including the junction node JN and the plate node PN by expressing the junction node JN into which the plurality of the junction nodes JN1, JN2, . . . , JNm, . . . , JN2m, . . . , JNn are merged.

It can be handled also in the case of including multi-channel heat sources in the same manner as the Local DELPHI model including the junction node JN and the plate node PN, as the thermal resistance analysis model according to the third embodiment.

According to the third embodiment, there can be provided: the thermal resistance analysis model with satisfactory precision as a thermal resistance analysis model of the semiconductor integrated circuits which locally heat-generates at a plurality of places; and the semiconductor integrated circuit to which such a thermal resistance analysis model is applied.

As explained above, according to the embodiments, there can be provided: the thermal resistance analysis model with satisfactory precision as a thermal resistance analysis model of locally heat-generating semiconductor integrated circuits; and the semiconductor integrated circuit to which such a thermal resistance analysis model is applied.

[Other Embodiments]

As explained above, the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments and the like, whether described or not.

INDUSTRIAL APPLICABILITY

The thermal resistance analysis model of the embodiments can be applied to locally heat-generating semiconductor integrated circuits, and can also be applicable to wide fields, e.g. mobile computing devices, an in-vehicle devices, industrial equipment, medical devices, display devices, etc. using such semiconductor integrated circuits as electronic components.

What is claimed is:

1. A thermal resistance analysis model of a semiconductor integrated circuit comprising a die on which a semiconductor chip is disposed, the thermal resistance analysis model comprising:
   a bottom inner node at the die;
   a local heat-generating portion constituting a junction node and an additional plate node at the semiconductor chip;
   a first thermal resistance between the junction node and the additional plate node; and
   a second thermal resistance between the additional plate node and the bottom inner node, wherein
   the semiconductor integrated circuit is modeled and analyzed using a multi-thermal resistance network.

2. The thermal resistance analysis model according to claim 1, wherein
   the additional plate node is disposed at a substantially center portion of the semiconductor chip in a planar view.

3. The thermal resistance analysis model according to claim 1, wherein the semiconductor integrated circuit further comprises:
   a top inner node;
   a top outer node;
   a side node;
   a lead node; and
   a bottom outer node.

4. The thermal resistance analysis model according to claim 3, wherein
   the lead node further comprising a lead foot node and a lead side node.

5. The thermal resistance analysis model according to claim 3, wherein:
   the bottom inner node and the bottom outer node correspond respectively to an inside and an outside of a mounting substrate, the semiconductor chip being mounted on the mounting substrate, in the semiconductor integrated circuit;
   the top inner node and the top outer node correspond respectively to an inside and an outside of an upper surface case, the semiconductor chip is disposed in the upper surface case, in the semiconductor integrated circuit;
   the junction node corresponds to a junction portion, the junction portion becoming a heat source of the semiconductor chip, in the semiconductor integrated circuit; and
   the side node and the lead node correspond respectively to a side portion of the upper surface case and a disposing portion of a lead terminal, the semiconductor chip is disposed in the upper surface case, in the semiconductor integrated circuit.

6. The thermal resistance analysis model according to claim 1, further comprising:
   a substrate disposed in the semiconductor integrated circuit, the substrate configured to mount the die.

7. The thermal resistance analysis model according to claim 6, wherein the substrate comprises
   an insulating substrate, and
   a first electrode layer disposed on the insulating substrate, wherein
   the semiconductor chip is mounted on the first electrode layer via the die.

8. The thermal resistance analysis model according to claim 6, wherein the substrate comprises
   an insulating substrate,
   a first electrode layer disposed on the insulating substrate, and
   a second electrode layer disposed on a back side surface opposite to the first electrode layer of the insulating substrate, wherein
   the semiconductor chip is mounted on the first electrode layer via the die.

9. The thermal resistance analysis model according to claim 6, wherein the substrate comprises
   an insulating substrate,
   a first electrode layer disposed on the insulating substrate,
   a second electrode layer disposed on a back side surface opposite to the first electrode layer of the insulating substrate,
   a first plane electrode layer embedded in an inside of the insulating substrate, and
   a second plane electrode layer embedded in an inside of the insulating substrate between the first plane electrode layer and the second electrode layer, wherein
   the semiconductor chip is mounted on the first electrode layer via the die.

10. The thermal resistance analysis model according to claim 1, wherein
    the semiconductor chip comprises a plurality of heat sources, and
    the local heat-generating portion comprises one heat source, the plurality of heat sources being merged into the one heat source.

11. The thermal resistance analysis model according to claim 1, wherein
    the semiconductor chip comprised heat sources of a plurality of channels, and
    the local heat-generating portion comprises a heat source of arbitrary one channel in the plurality of channels.

12. The thermal resistance analysis model according to claim 11, wherein
    the heat sources of the plurality of channels comprises a junction portion of a plurality of power transistors disposed in parallel to each other.

13. A thermal resistance analysis model of a semiconductor integrated circuit comprising a die on which a semiconductor chip is disposed, the thermal resistance analysis model comprising:

a bottom inner node at the die;

a first local heat-generating portion constituting a first junction node, a second local heat-generating portion constituting a second junction node and an additional plate node at the semiconductor chip, wherein the second local heat-generating portion separated from the first local heat-generating portion;

a first thermal resistance between the first junction node and the additional plate node;

a second thermal resistance between the additional plate node and the bottom inner node;

a third thermal resistance between the additional plate node and the second junction node; and a fourth thermal resistance between the first junction node and the second junction node, wherein the semiconductor integrated circuit is modeled and analyzed using a multi-thermal resistance network.

14. The thermal resistance analysis model according to claim 13, wherein the additional plate node is disposed at a substantially center portion of the semiconductor chip in a planar view.

15. The thermal resistance analysis model according to claim 13, wherein the semiconductor integrated circuit further comprising:

a top inner node;

a top outer node;

a side node;

a lead node; and a bottom outer node.

16. The thermal resistance analysis model according to claim 15, wherein the lead node further comprising a lead foot node and a lead side node.

17. The thermal resistance analysis model according to claim 15, wherein the bottom inner node and the bottom outer node respectively correspond respectively to an inside and an outside of a mounting substrate, the semiconductor chip being mounted on the mounting substrate, in the semiconductor integrated circuit;

the top inner node and the top outer node correspond respectively to an inside and an outside of an upper surface case, the semiconductor chip is disposed in the upper surface case, in the semiconductor integrated circuit;

the first junction node and the second junction node correspond respectively to two junction portions, the two junction portions respectively becoming heat sources of the semiconductor chip, in the semiconductor integrated circuit; and the side node and the lead node correspond respectively to a side portion of the upper surface case and a disposing portion of a lead terminal, the semiconductor chip is disposed in the upper surface case, in the semiconductor integrated circuit.

18. The thermal resistance analysis model according to claim 15, wherein the semiconductor chip comprises an integrated circuit for system power supply.

19. The thermal resistance analysis model according to claim 18, wherein the first local heat-generating portion and the second local heat-generating portion comprise heat generation profiles different from each other.

20. A semiconductor integrated circuit to which the thermal resistance analysis model according to claim 1 is applied.

* * * * *